US012432712B2

(12) United States Patent
Wu et al.

(10) Patent No.: US 12,432,712 B2
(45) Date of Patent: Sep. 30, 2025

(54) SYSTEM AND METHOD FOR SCHEDULING CONTROL CHANNEL INFORMATION

(71) Applicant: GOOGLE LLC, Mountain View, CA (US)

(72) Inventors: Chih-Hsiang Wu, Taoyuan (TW); Kao-Peng Chou, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 674 days.

(21) Appl. No.: 17/442,935

(22) PCT Filed: Mar. 27, 2020

(86) PCT No.: PCT/US2020/025124
§ 371 (c)(1),
(2) Date: Sep. 24, 2021

(87) PCT Pub. No.: WO2020/198555
PCT Pub. Date: Oct. 1, 2020

(65) Prior Publication Data
US 2022/0150922 A1 May 12, 2022

Related U.S. Application Data

(60) Provisional application No. 62/824,533, filed on Mar. 27, 2019.

(51) Int. Cl.
*H04W 72/1263* (2023.01)
*H04W 24/08* (2009.01)
(Continued)

(52) U.S. Cl.
CPC ....... *H04W 72/1263* (2013.01); *H04W 24/08* (2013.01); *H04W 72/0446* (2013.01); *H04W 72/0453* (2013.01); *H04W 72/23* (2023.01)

(58) Field of Classification Search
None
See application file for complete search history.

(56) References Cited

U.S. PATENT DOCUMENTS 11,012,992 B2   5/2021   Kim et al.
2004/0013103 A1* 1/2004  Zhang ................. H04W 52/146
                                                    370/468

(Continued)

FOREIGN PATENT DOCUMENTS

CN   107852316 A  *  3/2018  ......... H04L 27/0008
CN   108605342 A     9/2018
(Continued)

OTHER PUBLICATIONS

Qualcomm Incorporated, "Control channel multi-beam operation", vol. RAN WG1, No. Prague, Czech Republic; Aug. 21, 2017-Aug. 25, 2017, (Aug. 20, 2017), 3GPP Draft; R1-1713420.*

(Continued)

*Primary Examiner* — Andrew C Oh
(74) *Attorney, Agent, or Firm* — MARSHALL, GERSTEIN & BORUN LLP

(57) ABSTRACT

To obtain control channel information from a base station that communicates with the user device via a shared carrier, a user device monitors (1502) a control channel on the shared carrier according to a pre-transmission pattern of control channel occasions. While monitoring the control channel using the pre-transmission pattern, the user device receives (1504) from the base station, via the shared carrier, a signal indicating a transmission time during which the shared carrier is available to the base station. In response to receiving the signal, the base station monitors (1506), during the transmission time, the control channel on the shared carrier according to a transmission pattern of control channel occasions that is different than the pre-transmission pattern (Continued)

but includes at least one control channel occasion that overlaps a control channel occasion of the pre-transmission pattern.

26 Claims, 16 Drawing Sheets

(51) Int. Cl.
*H04W 72/0446* (2023.01)
*H04W 72/0453* (2023.01)
*H04W 72/23* (2023.01)

(56) References Cited

U.S. PATENT DOCUMENTS

| | | | | |
|---|---|---|---|---|
| 2014/0269519 | A1* | 9/2014 | Shan | H04L 5/0053 |
| | | | | 370/329 |
| 2016/0234833 | A1* | 8/2016 | Shimezawa | H04W 72/21 |
| 2017/0099678 | A1 | 4/2017 | Dinan | |
| 2017/0134124 | A1* | 5/2017 | Lee | H04W 72/23 |
| 2017/0202008 | A1 | 7/2017 | Nader et al. | |
| 2017/0311342 | A1* | 10/2017 | You | H04B 7/0695 |
| 2017/0318566 | A1 | 11/2017 | Deogun et al. | |
| 2018/0048448 | A1 | 2/2018 | Zhang et al. | |
| 2018/0049175 | A1* | 2/2018 | Bagheri | H04L 5/0048 |
| 2018/0077688 | A1 | 3/2018 | Yi et al. | |
| 2018/0270798 | A1* | 9/2018 | Park | H04W 72/23 |
| 2018/0278392 | A1* | 9/2018 | Onggosanusi | H04L 5/0048 |
| 2018/0368133 | A1* | 12/2018 | Park | H04L 5/0064 |
| 2019/0059085 | A1 | 2/2019 | Sun et al. | |
| 2019/0069258 | A1 | 2/2019 | Jeon et al. | |
| 2019/0081687 | A1* | 3/2019 | Sadiq | H04W 74/0833 |
| 2019/0082456 | A1* | 3/2019 | Kim | H04L 27/2602 |
| 2019/0132845 | A1* | 5/2019 | Babaei | H04L 1/1812 |
| 2019/0182870 | A1* | 6/2019 | Shih | H04W 74/0833 |
| 2019/0215900 | A1* | 7/2019 | Pan | H04W 72/23 |
| 2019/0229855 | A1* | 7/2019 | Li | H04L 1/1896 |
| 2019/0289665 | A1* | 9/2019 | Yang | H04W 72/0453 |
| 2019/0297603 | A1* | 9/2019 | Guo | H04L 5/0053 |
| 2019/0306832 | A1* | 10/2019 | Si | H04W 76/15 |
| 2019/0342035 | A1* | 11/2019 | Zhang | H04L 5/0055 |
| 2019/0363840 | A1* | 11/2019 | Wang | H04L 1/1854 |
| 2019/0372813 | A1* | 12/2019 | Moroga | H04L 27/26526 |
| 2021/0076445 | A1* | 3/2021 | Tsai | H04W 76/19 |

FOREIGN PATENT DOCUMENTS

| | | | | |
|---|---|---|---|---|
| CN | 110035510 | A * | 7/2019 | |
| CN | 110943806 | A * | 3/2020 | H04L 1/1614 |
| CN | 110943815 | A * | 3/2020 | H04L 1/1812 |
| CN | 111788856 | A * | 10/2020 | H04L 5/00 |
| CN | 112042143 | A | 12/2020 | |
| EP | 2639994 | A2 * | 9/2013 | H04L 5/0023 |
| EP | 3606195 | B1 * | 1/2022 | H04B 17/373 |
| KR | 20180004212 | A * | 1/2018 | |
| WO | WO-2011053857 | A1 * | 5/2011 | H04L 1/0038 |
| WO | WO-2015058401 | A1 * | 4/2015 | H04L 5/0092 |
| WO | WO-2015120305 | A1 * | 8/2015 | H04J 11/0056 |
| WO | WO-2017174469 | A1 * | 10/2017 | H04W 4/70 |
| WO | WO-2018143275 | A1 * | 8/2018 | H04L 27/2602 |
| WO | WO-2019013548 | A1 * | 1/2019 | H04L 1/00 |
| WO | WO-2019/143173 | A1 | 7/2019 | |
| WO | WO-2020056752 | A1 * | 3/2020 | |

OTHER PUBLICATIONS

Motorola Mobility et al., "Feature Lead Summary for NR-U DL Signals and Channels", 3GPP Draft; R1-1903687_featurelead_7.2.2.1.2, 3rd Generation Partnership Project, 3GPP TSG RAN WG1#96, Feb. 25-Mar. 1, 2019, 22 pages.

Ericsson, "DL Signals and Channels for NR-U", 3GPP Draft; R1-1902881, 3rd Generation Partnership Project, 3GPP TSG-RAN WG1 Meeting #96, Feb. 25-Mar. 1, 2019, 7 pages.

Zte et al., "Considerations on DL Reference Signals and Channels Design for NR-U", 3GPP Draft; R1-1901607, 3rd Generation Partnership Project, 3GPP TSG RAN WG1 #96, Feb. 25-Mar. 1, 2019, 5 pages.

Panasonic, "DL Signals and Channels for NR-U", 3GPP Draft; R1-1902530, 3rd Generation Partnership Project, 3GPP TSG-RAN WG1 #96, 6 pages.

International Search Report and Written Opinion for Application No. PCT/US2020/025124, dated Jul. 15, 2020, 19 pages.

Written Opinion of the IPEA dated Mar. 5, 2021, 13 pages.

Qualcomm Incorporated, "DL Signals and Channels for NR-U", 3GPP TSG RAN WG1 Meeting #94 bis, R1-1811250, Sep. 29, 2018, 9 pages.

MediaTek Inc., "DL Signals and Channels for NR-U Operation", 3GPP TSG RAN WG1 Meeting #95, R1-1812354, Nov. 3, 2018, 7 pages.

Qualcomm Inc., "New WID on NR-based Access to Unlicensed Spectrum", 3GPP TSG RAN Meeting #82, RP-182878, Dec. 13, 2018, 8 pages.

ZTE, "Considerations on DL Reference Signals and Channels Design for NR-U", 3GPP TSG RAN WG1 Ad-hoc Meeting, R1-1900098, Jan. 12, 2019, 4 pages.

3rd Generation Partnership Project; Technical Specification Group Radio Access Network; Study on NR-based Access to Unlicensed Spectrum (Release 16), 3GPP TR 38.889 V16.0.0, Dec. 2018, 119 pages.

3rd Generation Partnership Project; Technical Specification Group Radio Access Network; NR; Multiplexing and Channel Coding (Release 16), 3GPP TS 38.212 V16.0.0, Dec. 2019, 145 pages.

3rd Generation Partnership Project: Technical Specification Group Radio Access Network; NR; Physical Layer Procedures for Control (Release 16), 3rf 3GPP TS 38,213 V16.0.0, Dec. 2019, 146 pages.

Maglogiannis et al., "Cooperation Techniques Between LTE in Unlicensed Spectrum and Wi-Fi Towards Fair Spectral Efficiency", Sensors 2017, xx, 1994, 26 pages.

Motorola Mobility, Lenovo, "Feature Lead Summary for NR-U DL Signals and Channels", lo 3GPP TSG RAN WG1#97, R1-1907705, May 16, 2019, 24 pages.

First Office Action for Chinese Application No. 202080033865.1, dated Jul. 31, 2024.

Intention to Grant for European Application No. 20720656.6, dated May 2, 2024.

* cited by examiner

SYSTEM AND METHOD FOR SCHEDULING CONTROL CHANNEL INFORMATION

FIELD OF THE DISCLOSURE

This disclosure relates to wireless communications and, more particularly, to scheduling the transmission of control channel information in an unlicensed or otherwise shared spectrum.

BACKGROUND

This background description is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some wireless communication networks allow compatible devices to share an unlicensed carrier with other radio access technologies. In such cases, to fairly allocate the shared medium, devices operating in the unlicensed carrier typically need to perform channel access procedures before transmitting messages. In particular, a device may need to listen for other communications (i.e., detect energy) on the unlicensed carrier before using the carrier to transmit information, thereby reducing or eliminating interference with the communications of other networks/devices.

The 3rd Generation Partnership Project (3GPP) specification for fifth-generation (5G) new radio ("NW") networks, and specifically 3GPP TS 38.899 v16.0.0 (addressing the use of unlicensed carriers for 5G NR devices under what is commonly referred to as the "NR-U" study item), attempts to maintain fair co-existence with other radio access technologies such as WiFi® (IEEE 802.11) by requiring that 5G NR devices perform a "listen-before-talk" (LBT) channel access procedure before transmitting via the unlicensed carrier. This restriction on usage of the unlicensed carrier can be problematic for communications that would otherwise be synchronized or tightly scheduled. In NR-U, for example, a base station (e.g., a gNB) must perform a successful LBT procedure to establish a channel occupancy time (COT) before using the unlicensed carrier to send physical downlink control channel (PDCCH) information to a user device (commonly referred to using the acronym "UE" for "user equipment"). Thus, the user device does not know a priori when the base station might send control channel information, and does not know when to monitor the PDCCH. Continuous or nearly continuous monitoring of the PDCCH is not a satisfactory solution, as this would greatly increase power consumption at the user device.

According to one proposal, the user device would monitor the PDCCH at a relatively high rate until the user device receives a signal from the base station indicating that the base station has established a COT. Shortly thereafter, the user device begins monitoring the PDCCH at a relatively low rate. While this approach provides the base station more opportunities to begin transmitting control channel information via the PDCCH, and can also reduce power consumption in the user device, problems still arise because the user device may fail to receive the signal indicating the start of the COT. Thus, the base station may not know whether the user device has shifted to a different PDCCH monitoring pattern.

SUMMARY

A base station of this disclosure (e.g., a gNB) communicates with a user device via a shared carrier, and uses a channel access procedure (e.g., LBT) to gain access to the shared carrier. The base station configures the user device to monitor a control channel (e.g., a PDCCH) according to one pattern of control channel occasions (the "pre-transmission pattern") before a transmission time (e.g., a COT) begins for the base station, and according to a different pattern of control channel occasions (the "transmission pattern") when the transmission time is underway.

The pre-transmission and transmission patterns, while different, include at least one overlapping control channel occasion. For example, the pre-transmission pattern may include control channel occasions at the start and mid-point of each time unit, while the transmission pattern may only include a single control channel occasion at the start of each time unit. By virtue of the overlapping occasion(s), the base station is aware of at least one occasion per time unit in which the user device should be monitoring the control channel, regardless of whether the user device has yet received from the base station a signal indicating the transmission time has started, a signal indicating the transmission time has ended, or a signal indicating a switch from the pre-transmission pattern to the transmission pattern, and regardless of whether the user device has yet switched from the pre-transmission pattern to the transmission pattern or vice versa. Thus, for example, the base station may reliably know when to transmit the signal that informs the user device of the transmission time, and also, in some implementations, when to re-transmit the signal to the user device (to increase the likelihood that the user device will learn that the transmission time is underway).

In various implementations, the base station may send the user device a wake-up signal (WUS), a signal indicating that the transmission time has started, or a signal indicating the structure of the transmission time (e.g., a COT duration), to inform the user device of the transmission time and trigger the change to the transmission pattern of control channel occasions. In some implementations where the base station re-transmits the signal one or more times to ensure reception by the user device, the base station updates the transmission time information in the signal with each re-transmission. For example, the initial transmission of a signal may indicate the full duration of a COT, while a re-transmission of the signal may instead indicate the amount of time that remains in the COT when the re-transmission occurs.

In some implementations, the base station configures the user device (e.g., via one or more radio resource control (RRC) messages, one or more medium access control (MAC) control elements, one or more downlink control information (DCI), etc.) to monitor the control channel according to two different patterns of control channel occasions, and the user device selectively executes the pre-transmission pattern or the transmission pattern by combining the occasions of the two patterns in different ways. For example, the user device may execute the pre-transmission pattern by monitoring the control channel during all occasions of a first pattern and all occasions of a second pattern, and then change to the transmission pattern by monitoring the control channel only during the occasions of the first pattern and not the second pattern. As another example, the user device may execute the pre-transmission pattern by monitoring the control channel during all occasions of the first pattern, and then change to the transmission pattern by monitoring the control channel only during those occasions of the first and second pattern that overlap each other. As a further example, the user device may execute the pre-transmission pattern by monitoring the control channel only during occasions of the first pattern, and then change to the transmission pattern by monitoring the control channel during all occasions of the first pattern and all occasions of the second pattern.

In some implementations, the base station configures the user device to use different time-frequency resources when monitoring the control channel during the occasions of different patterns. In the above examples, for instance, the base station may configure the user device to use a first time-frequency resource (e.g., a first search space configuration) when monitoring during occasions of the first pattern, and a second, different time-frequency resource (e.g., a second search space configuration) when monitoring during occasions of the second pattern. Additionally or alternatively, in some implementations, and to increase the granularity with which the base station can send control channel information, the base station sends the user device a wake-up signal to cause the user device to monitor the control channel on a single, additional occasion that does not overlap any occasions of the first or second pattern.

One example embodiment of these techniques is a method of obtaining control channel information from a base station that communicates with a user device via a shared carrier. The method can be implemented in the user device using processing hardware and comprises monitoring a control channel on the shared carrier according to a pre-transmission pattern of control channel occasions; while monitoring the control channel using the pre-transmission pattern, receiving, from the base station via the shared carrier, a signal indicating a transmission time during which the shared carrier is available to the base station; and in response to receiving the signal, monitoring, during the transmission time, the control channel on the shared carrier according to a transmission pattern of control channel occasions that is different than the pre-transmission pattern but includes at least one control channel occasion that overlaps a control channel occasion of the pre-transmission pattern.

Another example embodiment of these techniques is a user device comprising processing hardware and configured to execute the method above.

Yet another example embodiment of these techniques is a method of providing control channel information to a user device that communicates with a base station via a shared carrier. The method can be implemented in the base station using processing hardware and comprises determining, using a channel access procedure, that the shared carrier is available to the base station for a transmission time; causing, at least by transmitting one or more messages to the user device via the shared carrier, the user device to monitor a control channel on the shared carrier according to a pre-transmission pattern of control channel occasions before the transmission time, and monitor the control channel on the shared carrier according to a transmission pattern of control channel occasions during the transmission time. The transmission pattern is different than the pre-transmission pattern but includes at least one control channel occasion that overlaps a control channel occasion of the pre-transmission pattern.

Another example embodiment of these techniques is a base station comprising processing hardware and configured to execute the method above.

DETAILED DESCRIPTION OF THE DRAWINGS

Using the techniques of this disclosure, a communication device such as a UE monitors a control channel on a shared carrier in a manner that reduces power consumption at the UE, and/or reduces the delay in starting a transmission (e.g., an uplink transmission that requires configuration of the UE via the control channel). As the term is used herein, a "carrier" may be any type of frequency spectrum or band, which corresponds to at least one channel in a given radio access network. Moreover, as used herein, a "shared" carrier may be an unlicensed carrier that is shared by different radio access networks and/or technologies, or a carrier that is shared in some other way and/or for some other reason (e.g., a carrier shared only among the multiple devices of a single radio access network).

These techniques are discussed below primarily with reference to 5G NR technologies, and more specifically with reference to operation of the 5G NR network over an unlicensed carrier (i.e., NR-U operation). However, the techniques of this disclosure can apply to other radio access technologies, and/or to other types of shared carriers (e.g., licensed bands that are shared by devices of a single radio access network). In the case of licensed bands, a channel access procedure of the type described below may or may not be performed.

Figure 1:
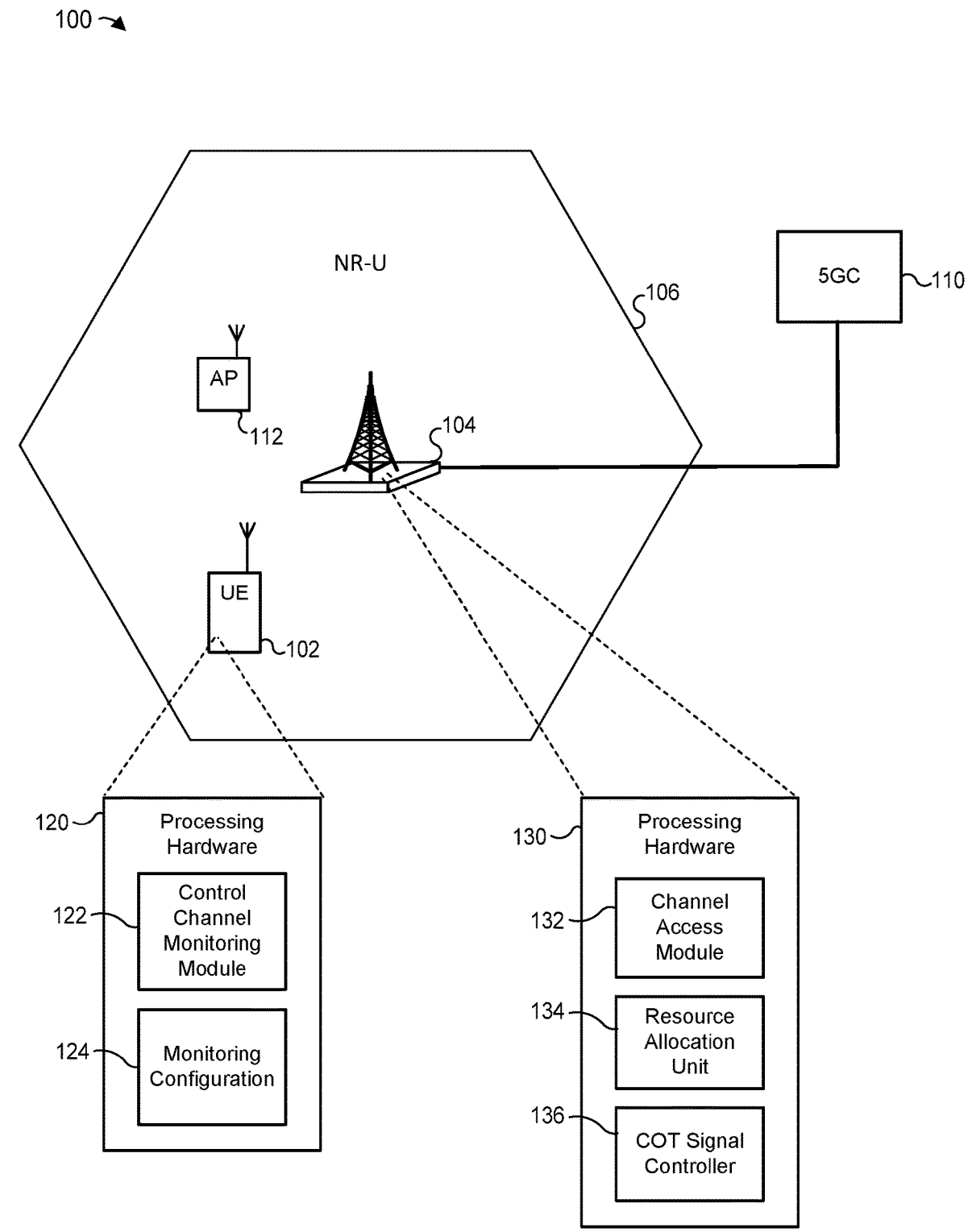
FIG. 1 is a block diagram of an example wireless communication network that implements the scheduling and channel monitoring techniques of this disclosure.

Referring first to FIG. 1, a wireless communication network 100 includes a UE 102, which can be any suitable device capable of wireless communications, as further discussed below. The wireless communication network 100 also includes a base station 104 associated with an NR-U cell 106 and connected (directly or indirectly) to a 5G core network (5GC) 110. The base station 104 may operate as a 5G Node B (gNB), a distributed unit gNB (gNB-DU), or an integrated access backhaul (IAB) node, for example. While FIG. 1 depicts the base station 104 as serving only the cell 106, it is understood that the base station 104 may also cover one or more additional cells not shown in FIG. 1. In general, the wireless communication network 100 can include any number of base stations, and each of the base stations may cover one, two, three, or any other suitable number of cells.

5G NR UEs operating in the cell 106, including the UE 102, can utilize an unlicensed carrier as well as portions of the radio spectrum allocated specifically to the service provider that operates the base station 104 and the 5GC 110. When exchanging data using the 5G NR air interface, the UE 102 and base station 104 may share the unlicensed carrier with other devices of other radio access networks. For example, other UEs (not shown in FIG. 1) may be subscribers of the service provider that operates the base station 104 and the 5GC 110, and be capable of communicating with the base station 104 via the unlicensed carrier. In addition, or alternatively, other UEs utilizing the unlicensed carrier may communicate with a base station or network node other than the base station 104, using a different radio access technology. FIG. 1 depicts an example of one such scenario, in which the UE 102 and base station 104 coexist with an access point (AP) 112. The AP 112 can utilize spectrum that includes, or is included within, at least a portion of the unlicensed carrier when operating in a wireless local area network (WLAN) according to one of the IEEE 802.11 standards. The AP 112 may be configured to communicate with one or more other devices not shown in FIG. 1, such as other UEs, for example. In other implementations and/or scenarios, the UE 102 and base station 104 also, or instead, coexist with devices operating according to other radio access technologies. In still another implementation and/or scenario, the base station 104 does not connect to the 5GC 110, and can operate as an AP (e.g., similar to AP 112). Thus, for example, the wireless communication network 100 may omit the 5GC 110, or only use the 5GC 110 in certain scenarios.

The UE 102 is equipped with processing hardware 120, which may include one or more general-purpose processors (e.g., CPUs) and a non-transitory computer-readable memory storing instructions that the one or more general-purpose processors can execute. Additionally or alternatively, the processing hardware 120 may include special-purpose processing units, such as a wireless communication chipset, for example. The processing hardware 120 includes a control channel monitoring module 122, and the memory of the processing hardware 120 stores a monitoring configuration 124. The control channel monitoring module 122 may be implemented using any suitable combination of hardware, software, and/or firmware. In one example implementation, the control channel monitoring module 122 includes a set of instructions that defines respective components of the operating system of the UE 102, and one or more CPUs of the processing hardware 120 execute these instructions to perform the channel monitoring functionality. In another implementation, the control channel monitoring module 122 is implemented using firmware as a part of a wireless communication chipset.

In operation, the control channel monitoring module 122 monitors a control channel in accordance with the monitoring configuration 124, which the gNB 104 provides to the UE 102. In some implementations and/or scenarios, the control channel monitoring module 122 monitors a PDCCH. In other implementations and/or scenarios, however, the control channel monitoring module 122 monitors a group-common PDCCH (GC-PDCCH). The monitoring configuration 124 can include descriptions of patterns of control channel occasions as well as the corresponding search space configuration. Each "control channel occasion" may represent a time or time window in which the gNB 104 can (i.e., according to a specification of the wireless communication network), but does not necessarily, transmit control channel information to the UE 102. As used herein, a "pattern" of control channel occasions refers to a temporal distribution of control channel occasions that repeats once per time unit, where the time unit is fixed and may be of any suitable length or duration depending on the implementation (e.g., a time slot, a set of N contiguous time slots, a subframe, etc.). As a simple example, a pattern might include only a single control channel occasion at the beginning of each time slot. Depending on the implementation, the pre-transmission pattern may contain more control channel occasions per time unit than the transmission pattern (e.g., to provide a finer time granularity in which the gNB 104 can send control channel information to a user device), less control channel occasions per time unit than the transmission pattern, or the same number of control channel occasions per time unit (albeit with a different distribution and/or time-shift).

The base station 104 is equipped with processing hardware 130, which may include one or more general-purpose processors (e.g., CPUs) and a non-transitory computer-readable memory storing instructions that the one or more general-purpose processors can execute. Additionally or alternatively, the processing hardware 130 may include special-purpose processing units, such as a wireless communication chipset, for example. The processing hardware 130 in the example implementation of FIG. 1 includes a channel access module 132, a resource allocation unit 134, and a COT signal controller 136.

The channel access module 132 performs a channel access procedure, such as an LBT procedure, to gain access to the shared carrier in the NR-U cell 106. When the channel access procedure is successful, the channel access module 132 determines that the gNB 104 has obtained or established a COT and accordingly can transmit various signals during the COT. The resource allocation unit 134 allocates to the UE 102 radio resources (i.e., time-frequency resources) and configuration parameters such as monitoring patterns of control channel (e.g., PDCCH) occasions, control resource sets (CORESETs), search spaces, etc. As discussed further below, the UE 102 can combine these control channel monitoring patterns in various ways to generate a pre-transmission monitoring pattern and a transmission monitoring pattern (or more specifically, in this implementation, a pre-COT monitoring pattern and a COT monitoring pattern). The COT signal controller 136 determines when the gNB 104 transmits, to the UE 102, an indication that the gNB 104 has gained a COT. The COT signal controller 136, in some implementations, also determines which format the gNB 104 should utilize for the indication. Example functionality of the components 132, 134, and 136 is discussed in more detail below, with reference to various example scenarios and monitoring patterns.

For simplicity, FIG. 1 does not depict various components of the UE 102 and the base station 104. In addition to the components mentioned above, for example, the UE 102 and the base station 104 include respective transceivers, which comprise various hardware, firmware, and/or software components configured to transmit and receive wireless signals. The processing hardware 120 and the processing hardware 130 can send commands and exchange information with the respective transceivers as needed to perform various connection establishment procedures, perform various RRC or mobility management (MM), or communicate with other network elements, etc.

FIGS. 2-14 illustrate several example configurations according to which the UE 102 can monitor a PDCCH. Generally speaking, the UE 102 monitors the PDCCH during at least two time intervals: before the gNB 104 gains access to the shared carrier and after the UE 102 receives an indication that the gNB 104 has gained access to the shared carrier. The UE 102 monitors the PDCCH associated with the shared carrier according to different patterns of PDCCH occasions during these two intervals, but with a certain overlap in the occasions of those patterns. Generally, a lower frequency of occasions causes the UE 102 to consume less power by, in at least some implementations, reduces the number of opportunities for the gNB 104 to send control channel information to the UE 102.

Figure 2:
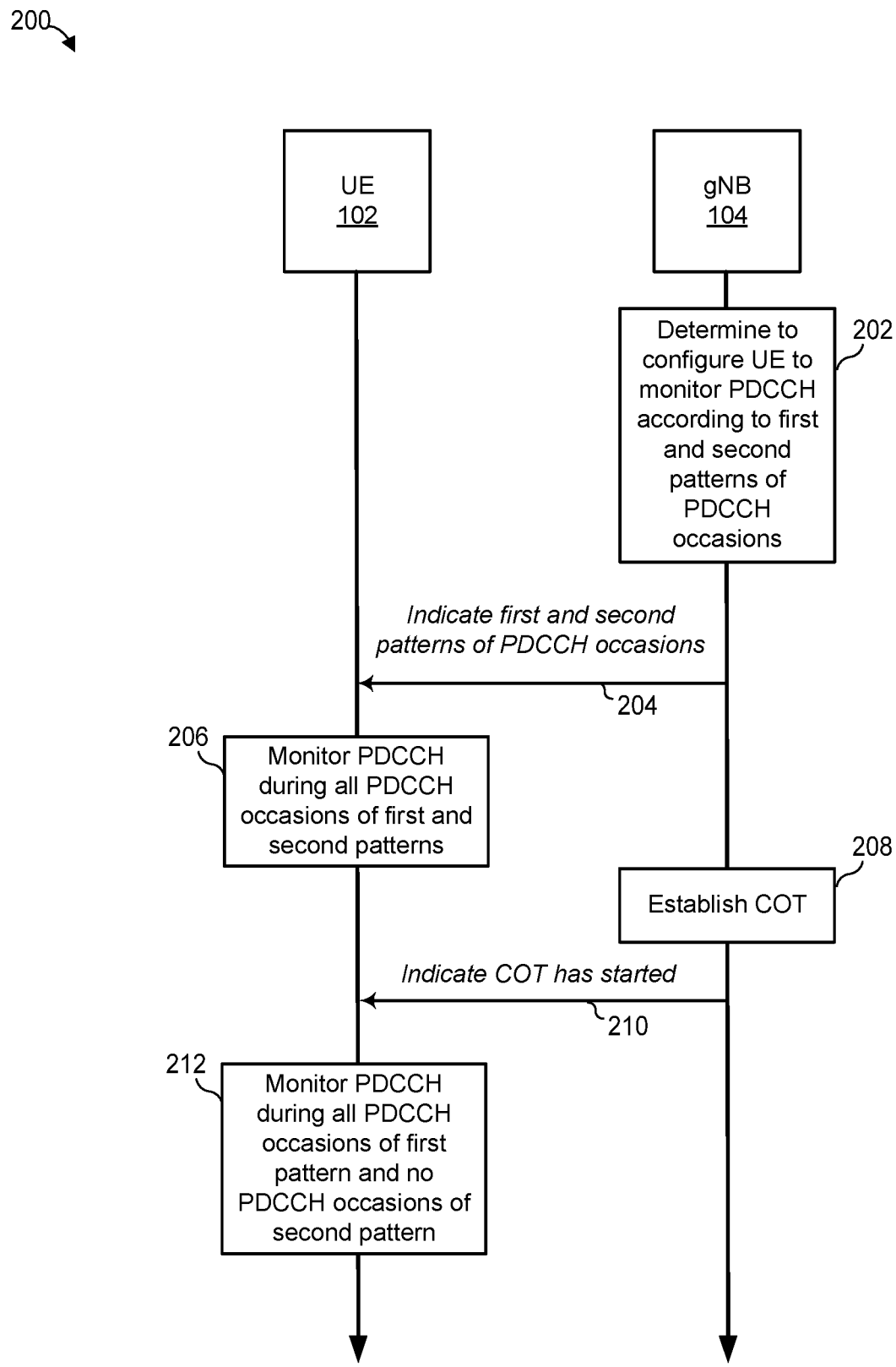
FIG. 2 depicts an example message sequence according to which a base station configures a UE with two patterns, and provides an indication of a time when the UE switches from monitoring a control channel according to the logical union of the first pattern and the second pattern to monitoring the control channel according to the first pattern only.
Figure 3:
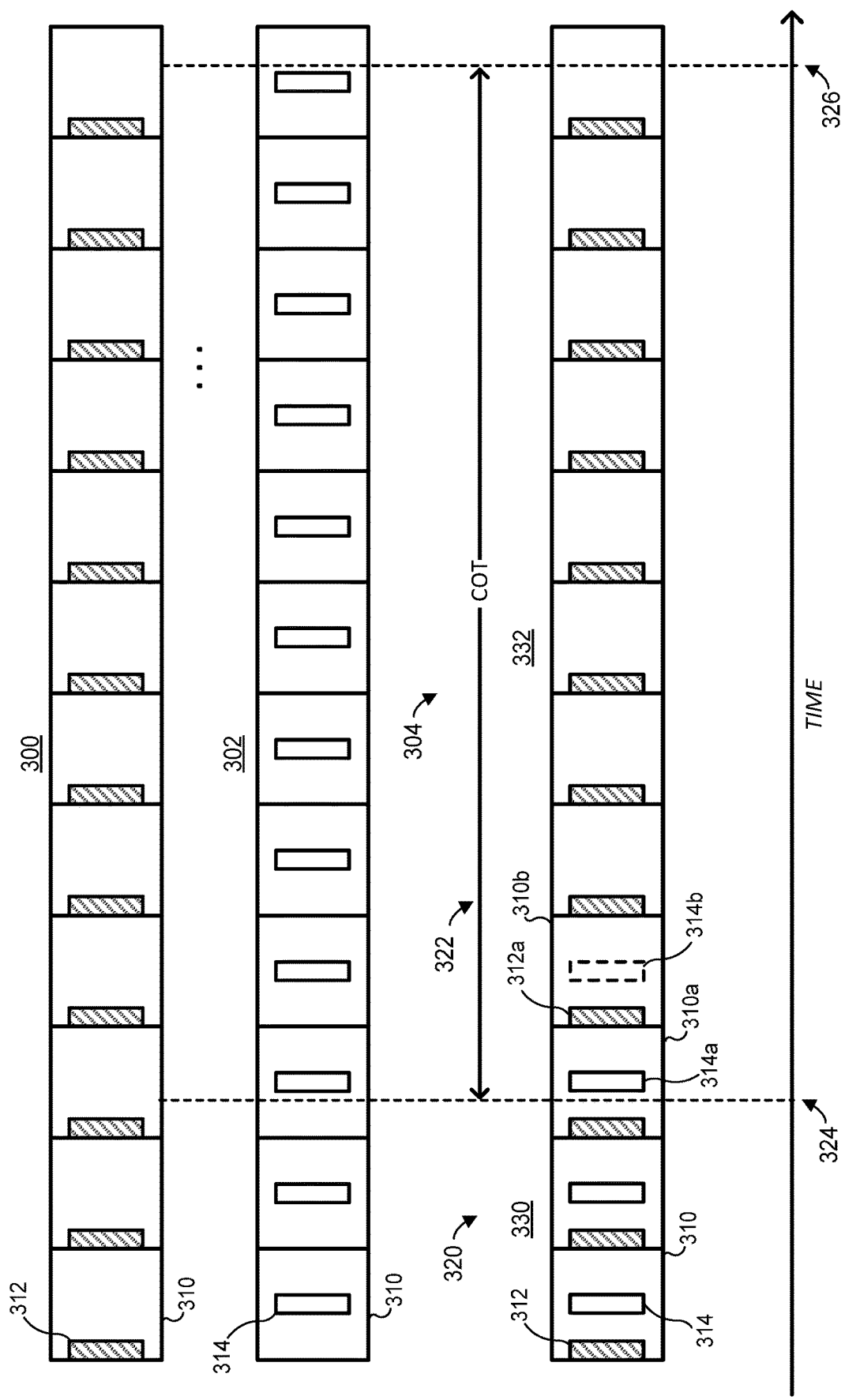
FIG. 3 is a timing diagram of example patterns that can correspond to the message sequence of FIG. 2.

Referring first to FIGS. 2 and 3, the gNB 104 in an example scenario 200 determines 202 to configure the UE 102 to monitor the PDCCH according to a first pattern 300 of PDCCH occasions and a second pattern 302 of PDCCH occasions. The gNB 104 indicates 204 the first and second patterns 300, 302 to the UE 102, e.g., by transmitting one or more configuration messages to the UE 102 via the shared carrier, as discussed further below. Generally, the UE 102 generates a dynamic monitoring schedule 304 using the patterns 300 and 302, as is also discussed in further detail below. In the example pattern 300, PDCCH occasions 312 occur at the beginning of each respective time unit 310, where each time unit 310 can be a time slot, a set of N contiguous time slots, a subframe, etc. In the example pattern 302, PDCCH occasions 314 occur at or near the mid-point of each respective time unit 310. In general, the PDCCH occasions 312 and 314 can occur at any time or times within the time unit 310. While the occasions 312 and 314 are referred to herein as PDCCH occasions, the techniques of this disclosure may also apply to GC-PDCCH occasions or other types of control channel occasions.

With continued reference to FIGS. 2 and 3, the schedule 304 covers a pre-COT 320, which is an interval of time before the gNB 104 establishes a COT 322, and the COT 322 itself. As seen in FIG. 3, the COT 322 begins at a time 324 and ends at a time 326. During the pre-COT 320, the UE 102 monitors 206 the PDCCH according to a pre-COT pattern 330 that includes all PDCCH occasions of the patterns 300 and 302. In other words, the UE 102 during this time monitors the PDCCH in accordance with the logical union of the patterns 300 and 302. During each time unit 310 of the pre-COT 320, the UE 102 monitors the PDCCH during both occasions 312 and occasions 314. After the gNB 104 gains access to the shared carrier to establish 208 the COT 322 (e.g., using channel access module 132), the gNB 104 indicates 210 to the UE 102 that the COT 322 has started. In response to this indication 210, and during the COT 322, the UE 102 monitors 212 the PDCCH in accordance with the pattern 300, and no longer monitors the PDCCH in accordance with the pattern 302.

To indicate 210 to the UE 102 that the COT 322 has started, the gNB 104 may transmit a WUS, a signal generally indicating that the COT 322 has started (e.g., a "COT indicator"), a signal indicating the structure of the COT 322 (e.g., the duration of COT 322), or another suitable signal (e.g., any suitable signal generated by COT signal controller 136) indicating that the UE 102 is to stop monitoring according to the pattern 302. Depending on the implementation, the gNB 104 may transmit the WUS or other signal at time 324, during the first PDCCH occasion of pattern 300 or 302 that occurs after time 324 (in this example, occasion 314a), or at another suitable time. In some implementations and/or scenarios, the gNB 104 transmits a signal indicating that the COT 322 has started only one time. In other implementations and/or scenarios, the gNB 104 transmits such a signal multiple times, so as to increase the probability that the UE 102 receives the signal and thus knows when to stop monitoring according to the pattern 302. In some implementations, the gNB 104 indicates 210 the COT 322 duration in a broadcast message. Several example techniques for indicating 210 that the COT 322 has started are discussed in more detail below.

In the example scenario reflected in FIG. 3, the COT 322 starts during a time unit 310a, after the occasion 312 of the pattern 300 within time unit 310a has occurred, but before the occasion 314 of the pattern 302 within time unit 310a (i.e., occasion 314a in FIG. 3) occurs. The UE 102 in this implementation thus monitors the PDCCH during the specific occasion 314a, but does not monitor the occasions 314 starting with the next time unit 310b for the duration of the COT 322. For clarity, FIG. 3 illustrates, with dashed outline, the first occasion 314b of pattern 302 during which the UE 102 does not monitor the PDCCH. In a different scenario (not depicted in FIG. 3), where the UE 102 fails to receive the WUS or other signal from the gNB 104 indicating that the COT 322 has started, the UE 102 would monitor the PDCCH during the occasion 314b, and in each subsequent occasion 314 of the pattern 302.

In another implementation, after the UE 102 receives the indication that the COT 322 has started, the UE 102 continues to monitor the PDCCH according to both pattern 300 and pattern 302 for a certain amount of time, or for a certain number of PDCCH occasions, etc., which the gNB 104 can configure dynamically or which can be a part of the corresponding 3GPP specification. Thereafter, but still during the COT 322, the UE 102 transitions to monitoring the PDCCH only during the occasions 312 of the pattern 300. In yet another implementation, the UE 102 switches from the logical union of the patterns 300, 302 to the pattern 302 only (rather than the pattern 300 only) after receiving the indication from the gNB 104.

Thus, the UE 102 monitors the PDCCH according to the pattern 300 regardless of whether the UE 102 has received an indication that the COT 322 has started, but utilizes the pattern 302 only during the pre-COT 320 (or possibly also, as noted above, for some relatively short time at the beginning of the COT 322). The occasions 312 accordingly define the overlap between the pre-COT pattern 330 that the UE 102 uses during the pre-COT 320 and the COT pattern 332 that the UE 102 uses the during the COT 322. The pre-COT pattern 330 and the COT pattern 332 in this example overlap in only a single PDCCH occasion per time unit 310, at the beginning of each time unit 310. More generally, however, the pre-COT pattern 330 and the COT pattern 332 may overlap in any suitable number of PDCCH occasions per time unit 310, and at any position or positions within the time unit 310.

The overlapping occasions between the pre-COT pattern 330 and the COT pattern 332 allow the gNB 104 to know at least some times during which the UE 102 should be monitoring the PDCCH, regardless of whether the UE 102 has yet received the signal from the gNB 104, and regardless of whether the UE 102 has yet switched from the pre-COT pattern 330 to the COT pattern 332. This is particularly important because the UE 102 might miss the signal indicating that the gNB 104 has established the COT 322, and because the UE 102 does not (in at least some implementations) acknowledge receipt of such a signal. Thus, the gNB 104 may generally be unaware of whether the UE 102 knows that the COT 322 has started. In some implementations, the gNB 104 can transmit, via the PDCCH, one or more additional indications that the COT 322 has started, during one of the occasions 312 (again, because the gNB 104 is aware that the UE 102 monitors the PDCCH according to the pattern 300, in both the pre-COT pattern 330 and the COT pattern 332). Alternatively or additionally, the gNB 104 may leverage the fact that the UE 102 is monitoring the PDCCH at least according to the pattern 300 to send control information to the UE 102 in one or more of the occasions 312.

Further, because the COT pattern 332 includes fewer occasions per time unit 310 than the pre-COT pattern 330, transitioning from the pre-COT pattern 330 to the COT pattern 332 allows the UE 102 to save power, as compared to the UE 102 monitoring the PDCCH at the higher frequency during both the pre-COT 320 and the COT 322. Still further, because the pre-COT pattern 330 includes more occasions per time unit 310 than the COT pattern 332, the gNB 104 during the pre-COT 320 has more opportunities to transmit information to the UE 102 on the PDCCH. After the COT 322 terminates, the UE 102 may revert to monitoring according to the pre-COT pattern (not shown), another pattern, or no pattern at all, depending on the embodiment.

Additionally or alternatively, the gNB 104 can transmit, on the PDCCH during one of the occasions 312, a DCI which can include downlink assignment information indicating that the UE 102 can receive on a certain physical downlink shared channel (PDSCH), or an uplink grant indicating that the UE 102 can transmit on a certain physical uplink shared channel (PUSCH). Thus, more opportunities for the gNB 104 to transmit on the PDCCH may result in more opportunities for the UE 102 to transmit or receive higher-layer messages or data.

In some situations, the gNB 104 may transmit to the UE 102 a signal indicating that the UE 102 should start monitoring according to the pattern 302, or indicating that the COT 322 has ended. In addition to monitoring the PDCCH according to the pattern 300, the UE 102 may monitor the PDCCH according to the pattern 302 in response to the signal. The UE 102 may start monitoring the PDCCH according to the pattern 302 immediately upon receiving the signal, or may start to monitor the PDCCH according to the pattern 302 after a certain amount of time passes after receiving the signal. The signal may be a DCI, for example. In other situations, if the UE 102 does not receive the signal and knows the end of the COT 322 (e.g., according to a COT structure indication as described below for FIG. 4), the UE 102 starts monitoring the patterns 300 and 302 after the end of the COT 322.

Figure 4:
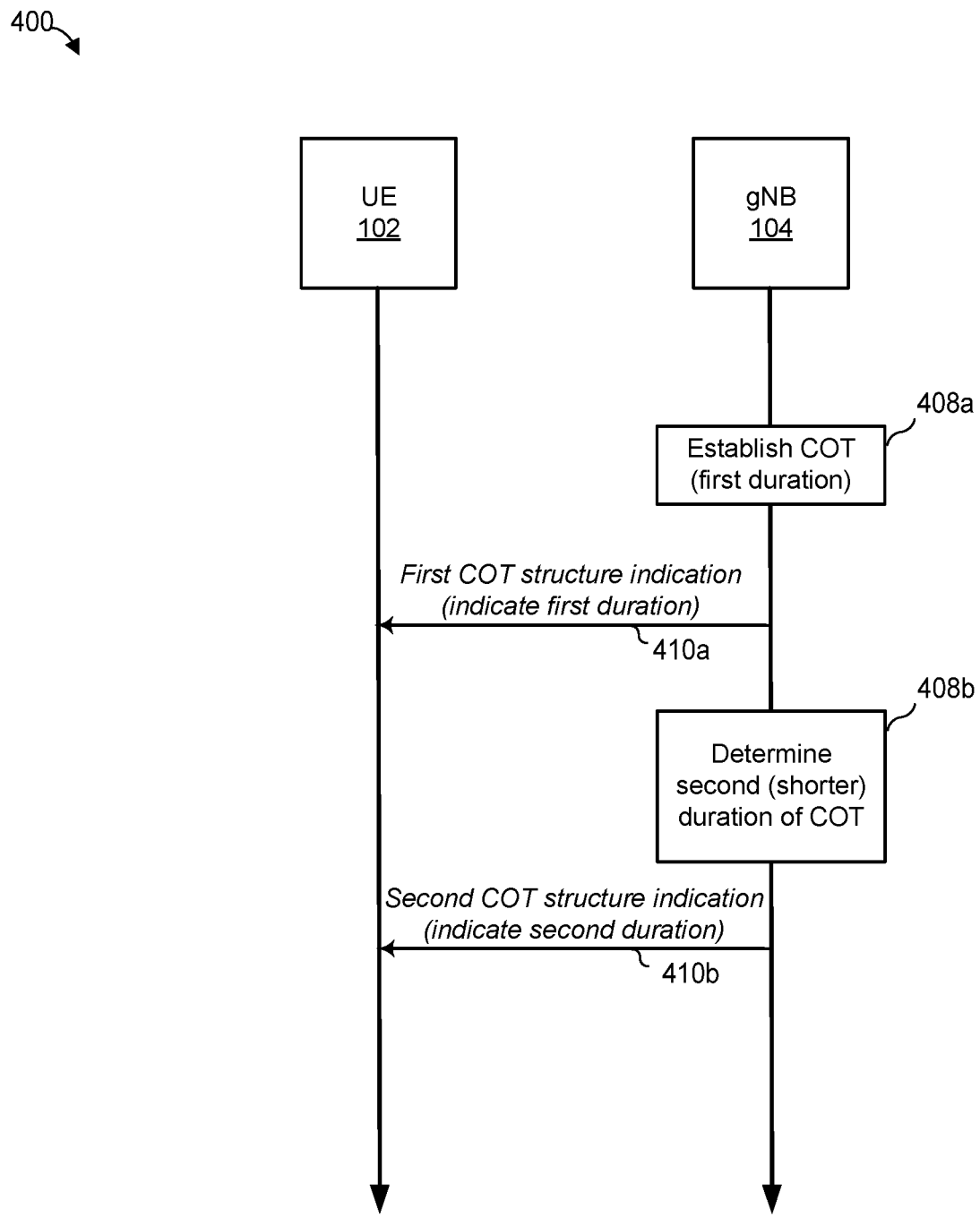
FIG. 4 depicts an example message sequence according to which a base station provides to the UE multiple indications of a transmission time during which the shared carrier is available to the base station.

Now referring to FIG. 4, the gNB 104 in an example scenario 400 provides to the UE 102 multiple indications of a COT (e.g., COT 322), during which the shared carrier is available to the gNB 104. As discussed above, the UE 102 in some cases may miss the indication that the gNB 104 has established a COT, and the UE 102 may not confirm to the gNB 104 when the UE 102 has successfully received such an indication. The gNB 104 in the implementation of FIG. 4 transmits the indication multiple times to increase the probability that the UE 102 is aware of the COT. However, this alone may not provide the UE 102 with sufficient information to know when the COT will end (e.g., time 326), and thus the UE 102 may not know how long to monitor the PDCCH according to the COT pattern (e.g., pattern 332).

Accordingly, to ensure that the UE 102 correctly identifies the end of the COT, the gNB 104 may include in each of the multiple transmissions an indication of the remaining duration of the COT. In particular, immediately or shortly after the gNB 104 establishes 408*a* a COT, the gNB 104 indicates 410*a* a first duration of the COT to the UE 102, e.g., by transmitting a first COT structure indication to the UE 102 via the shared carrier. The first duration may be an entire duration of the COT, which the gNB 104 may determine when the gNB 104 is granted access to the shared channel. At a later time, gNB 104 determines 408*b* the remaining (shorter) duration of the COT and indicates 410*b* the remaining duration to the UE 102, e.g., by transmitting a second COT structure indication to the UE 102 via the shared carrier. The gNB 104 may determine the remaining duration by subtracting a current timer value (e.g., a value of a timer that the gNB 104 started when the COT began) from the original/full duration of the COT. The gNB 104 may indicate the remaining duration of the COT using any suitable format and parameters, e.g., the end time (e.g., time 326) relative to the current time unit, the number of remaining time units, the number of remaining microseconds, etc.

Although the gNB 104 in the example scenario 400 indicates the COT duration two times, in general the gNB 104 can provide any suitable number of indications of the remaining COT time to the UE 102.

Figure 5:
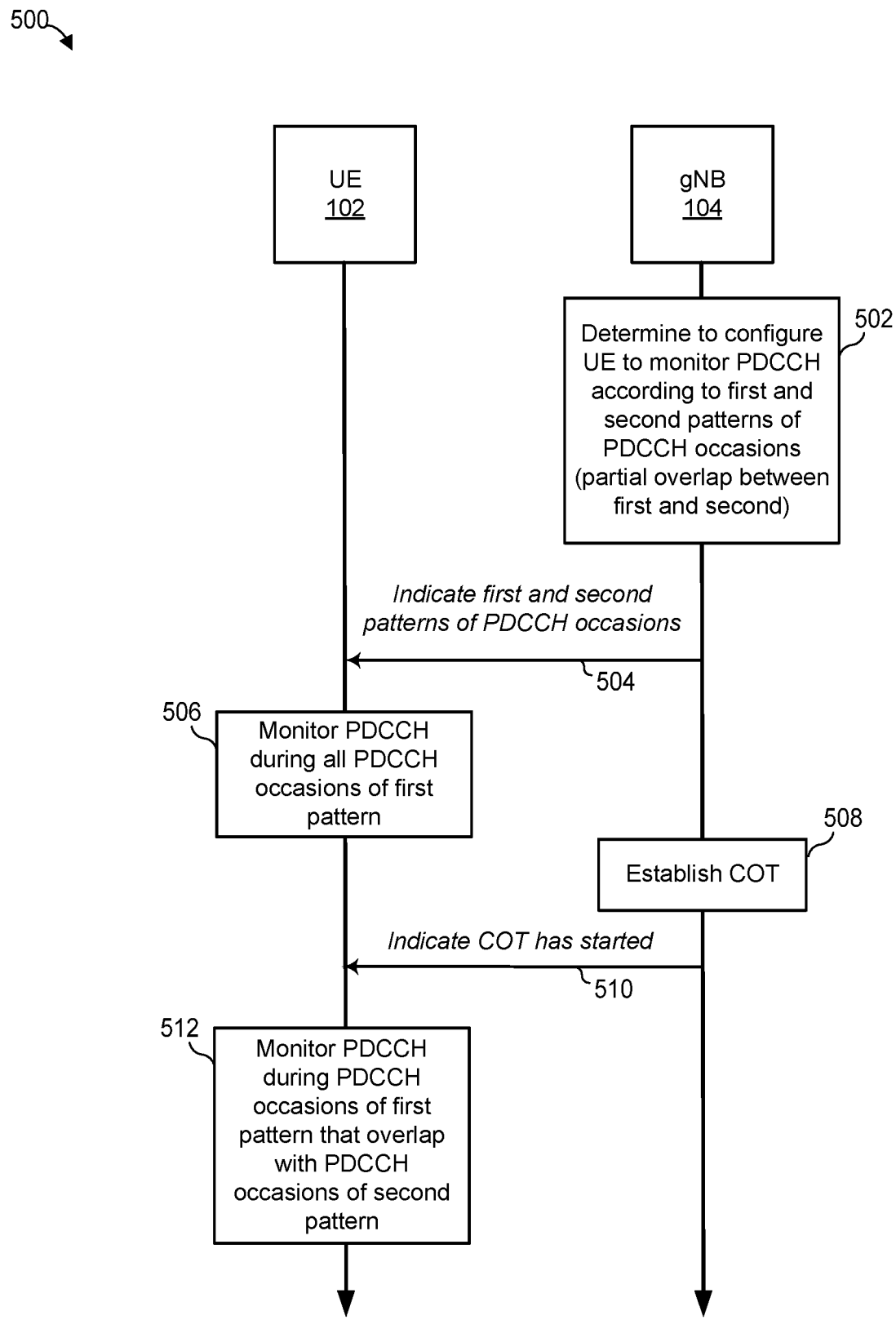
FIG. 5 depicts an example message sequence according to which a base station configures a UE with two partially overlapping patterns, and provides an indication of a time when the UE switches from monitoring a control channel according to the first pattern to monitoring the channel according to the logical intersection of the first pattern and the second pattern.

FIG. 5 illustrates another example scenario 500 in which the gNB 104 configures the UE 102 with two partially overlapping patterns, and the UE 102 uses these partially overlapping patterns to monitor a PDCCH according to a pre-COT pattern and a COT pattern. However, unlike the scenario of FIG. 2, the UE 102 in this case transitions from monitoring the PDCCH according to one of the patterns to monitoring the PDCCH according to the logical intersection of the two patterns. Again, the overlap in the occasions of the pre-COT and COT patterns allows the gNB 104 to rely on at least one occasion per time unit in which the UE 102 should be monitoring the PDCCH, regardless of whether UE 102 has yet received the signal from the gNB 104, and regardless of whether the UE 102 has yet switched from the pre-COT pattern to the COT pattern.

Figure 6:
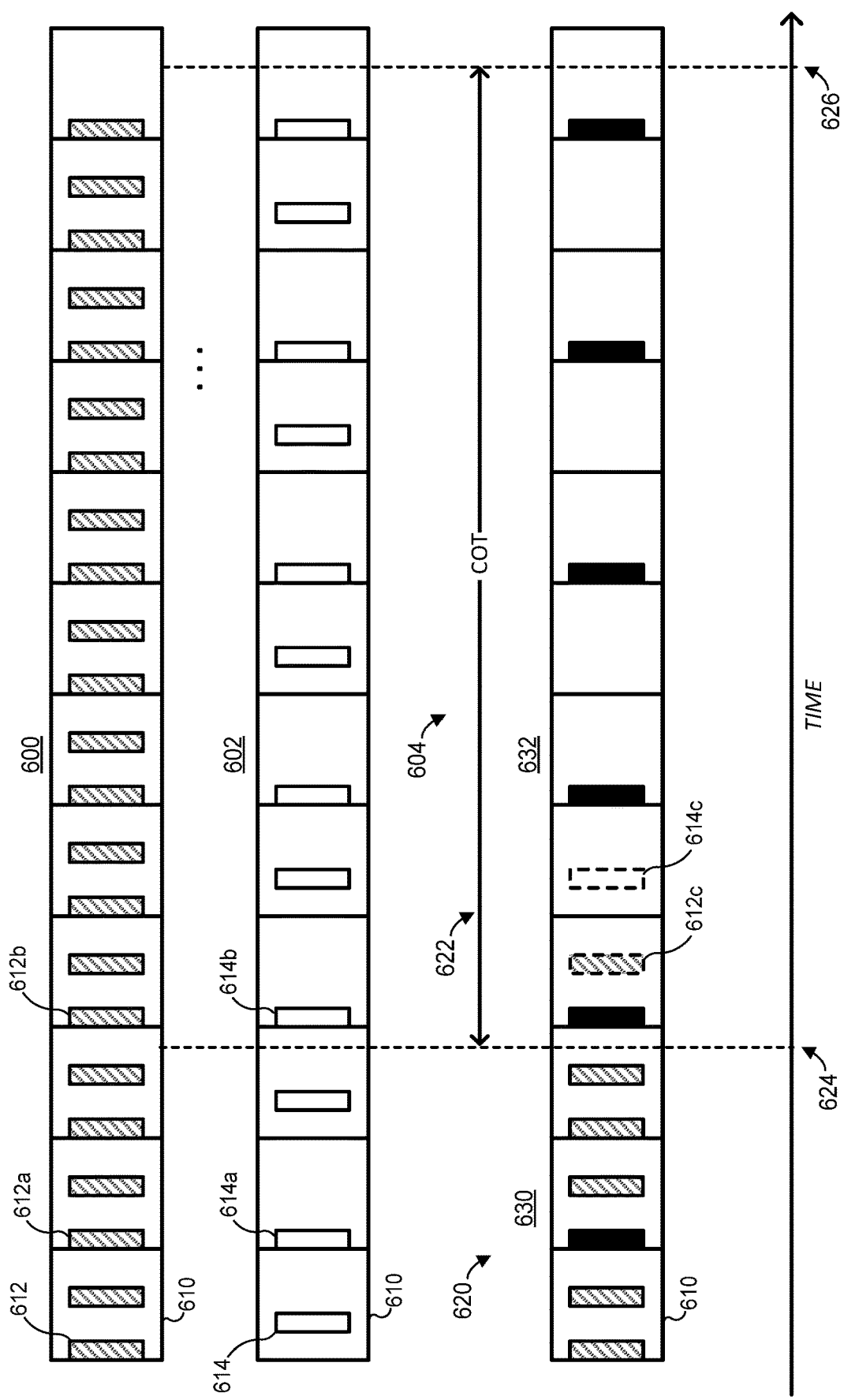
FIG. 6 is a timing diagram of example patterns that can correspond to the message sequence of FIG. 5.

Referring to both FIGS. 5 and 6, the gNB 104 first determines 502 to configure the UE 102 to monitor the PDCCH according to a first pattern 600 of PDCCH occasions and a second pattern 602 of PDCCH occasions. As seen in FIG. 6, the patterns 600 and 602 partially overlap, with an occasion 612a of the pattern 600 coinciding with an occasion 614a of the pattern 602. Thus, an overlapping occasion occurs once every two consecutive time units 610. In other implementations and/or scenarios, the gNB 104 may select or set monitoring patterns 600 and 602 such that the overlapping occasions are more or less frequent than shown in FIG. 6.

The gNB 104 indicates 504 the patterns 600 and 602 to the UE 102, e.g., by transmitting one or more configuration messages to the UE 102 via the shared carrier, as discussed further below. The UE 102 uses the patterns 600 and 602 to generate a dynamic monitoring schedule 604. Similar to the schedule 304 of FIG. 3, the schedule 604 covers a pre-COT 620, which is an interval of time before the gNB 104 establishes a COT 622, and the COT 622 itself. As seen in FIG. 6, the COT 622 starts at a time 624 and ends at a time 626. During the pre-COT 620, the UE 102 monitors 506 the PDCCH according to a pre-COT pattern 630. Also similar to the scenario of FIG. 3, the pre-COT pattern 630 is equivalent to the first pattern 600. In an alternative implementation, the pre-COT pattern 630 is a logical union of the patterns 600 and 602, while the COT pattern 632 is the logical intersection of the patterns 600 and 602.

Next, the gNB 104 establishes 508 the COT 622, and indicates 510 to the UE 102 that the COT 622 has started, or to monitor the logical intersection of the patterns 600 and 602. In response to this indication 510, and during the COT 622, the UE 102 monitors 512 the PDCCH in accordance with a COT pattern 632, which is the logical intersection of the patterns 600 and 602. In other words, the UE 102 monitors the PDCCH only during those PDCCH occasions of the pattern 600 that overlap a PDCCH occasion of the pattern 602, and vice versa. For example, the PDCCH occasion 612b of the pattern 600 coincides with the PDCCH occasion 614b of the pattern 602, and thus the UE 102 monitors the PDCCH during this overlapping occasion. On the other hand, the UE 102 does not monitor the PDCCH during the occasion 612c of pattern 600, because occasion 612c does not coincide with any occasion of pattern 602, and does not monitor the PDCCH during the occasion 614c of pattern 602, because occasion 614c does not coincide with any occasion of pattern 600.

The overlapping occasions between the pre-COT pattern 630 and the COT pattern 632 allow the gNB 104 to know at least some times during which the UE 102 should be monitoring the PDCCH, regardless of whether the UE 102 has yet received a WUS or other signal from the gNB 104, and regardless of whether the UE 102 has yet switched from the pre-COT pattern 630 to the COT pattern 632. This gNB 104 can make use of this knowledge when re-transmitting signals indicating the COT 622 to the UE 102, and/or when sending control information to the UE 102, as discussed above in connection with FIGS. 3 and 4.

In some situations, the gNB 104 may transmit to the UE 102 a signal indicating that the UE 102 is to start monitoring the PDCCH according to the pattern 600 instead of the logical intersection of the patterns 600 and 602, or indicating that the COT 622 has ended. Thereafter, the UE 102 monitors the PDCCH according to the pattern 600 in response to the signal. The UE 102 may start monitoring the PDCCH according to the pattern 600 immediately upon receiving the signal, or may start to monitor the PDCCH according to the pattern 600 after a certain amount of time passes after receiving the signal. The signal may be a DCI, for example. In other situations, if the UE 102 does not receive the signal and knows the end of the COT 622 (e.g., according to a COT structure indication as described for FIG. 4 above), the UE starts monitoring the pattern 600 after the end of the COT 622.

Figure 7:
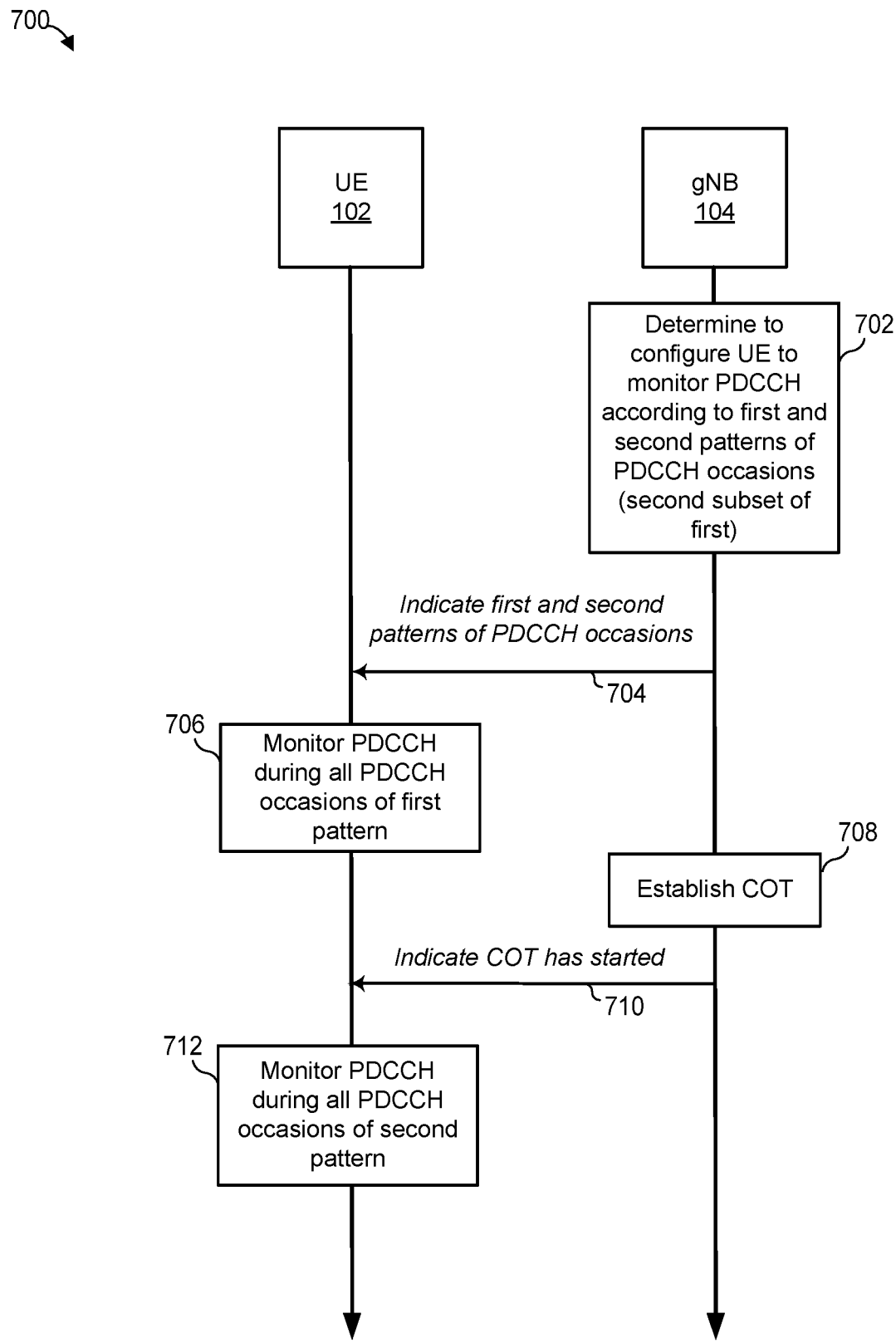
FIG. 7 depicts an example message sequence according to which a base station configures a UE with a first pattern and a second pattern that is a subset of the first pattern, and provides an indication of a time when the UE switches from monitoring a control channel according to the first pattern to monitoring the channel according the second pattern.

FIG. 7 illustrates another example scenario 700 in which the gNB 104 configures the UE 102 with two patterns, with one pattern being a subset of the other pattern, and the UE 102 uses these patterns to monitor a PDCCH according to a pre-COT pattern and a COT pattern. Thus, FIGS. 7 and 8 are a special case of FIGS. 5 and 6, respectively, because the COT pattern is a subset of the pre-COT pattern.

Figure 8:
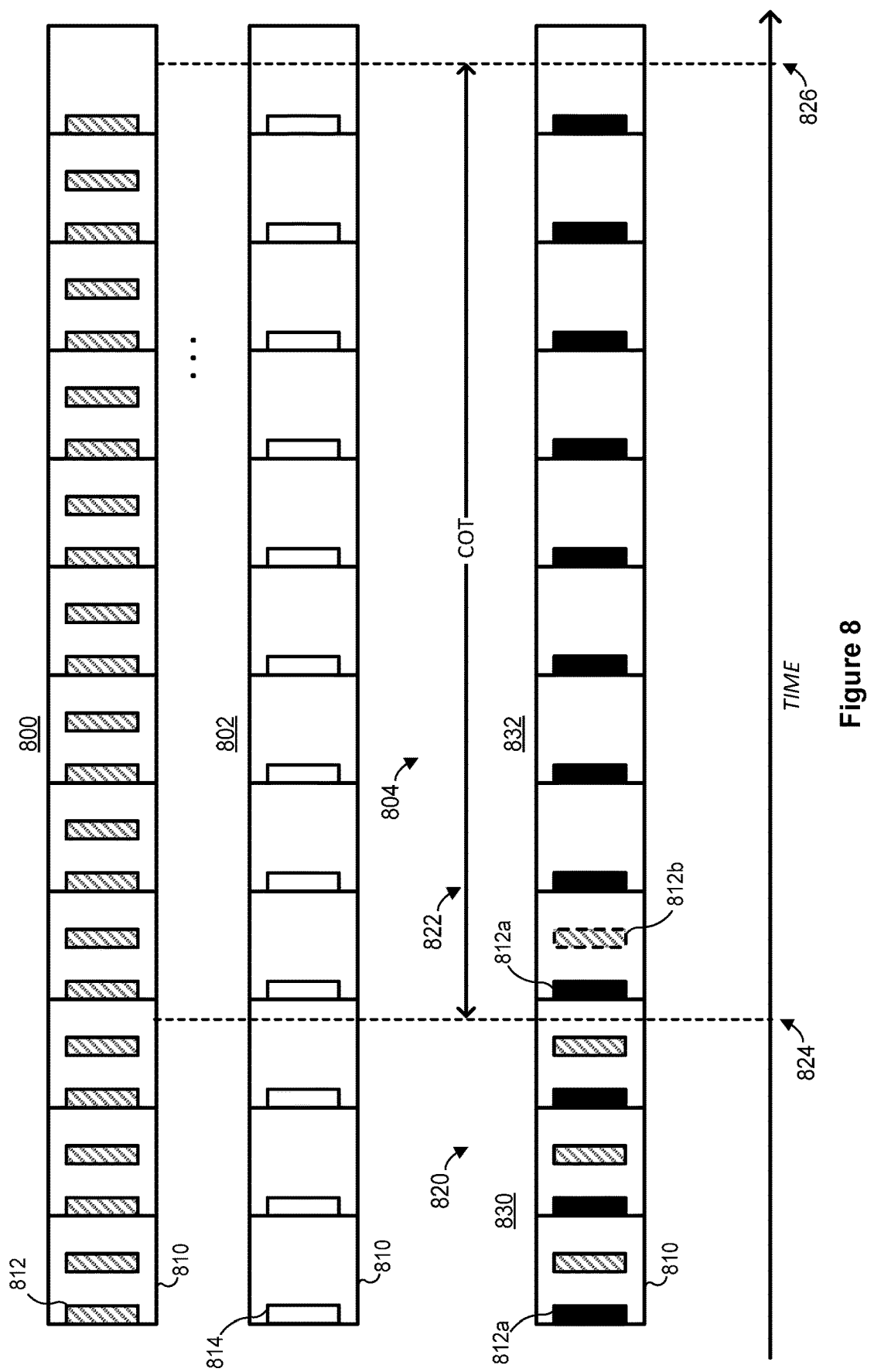
FIG. 8 is a timing diagram of example patterns that can correspond to the message sequence of FIG. 7.

Referring to both FIGS. 7 and 8, the gNB 104 first determines 702 to configure the UE 102 to monitor the PDCCH according to a first pattern 800 of PDCCH occasions and a second pattern 802 of PDCCH occasions. In this example, the pattern 802 is a subset of the pattern 800. As illustrated in FIG. 8, occasion 814 of pattern 802 coincides with the first occasion 812 of pattern 800 in each time unit 810. However, the pattern 800 also includes a second occasion in each time unit 810 that is not present in the pattern 802.

The gNB 104 indicates 704 the patterns 800 and 802 to the UE 102, e.g., by transmitting one or more configuration messages to the UE 102 via the shared carrier, as discussed further below. The UE 102 uses the patterns 800 and 802 to generate a dynamic monitoring schedule 804. Similar to the schedule 304 of FIG. 3, the schedule 804 covers a pre-COT 820, which is an interval of time before the gNB 104 establishes a COT 822, and the COT 822 itself. As seen in FIG. 8, the COT 822 starts at a time 824 and ends at a time 826. During the pre-COT 820, the UE 102 monitors 706 the PDCCH according to a pre-COT pattern 830. In this scenario, the pre-COT pattern 830 is the pattern 800, which happens to include every occasion of the pattern 802 and thus is equivalent to the logical union of the patterns 800 and 802.

Next, the gNB 104 establishes 708 the COT 822 and indicates 710 to the UE 102 that the COT 822 has been established or to monitor the PDCCH according to the pattern 802. In response to this indication 710, and during the COT 822, the UE 102 monitors 712 the PDCCH according to a COT pattern 832, which is simply the pattern 802. Because the COT pattern 832 is a subset of the pattern 800, the COT pattern 832 is equivalent to the logical intersection of the patterns 800 and 802.

The overlapping occasions between the pre-COT pattern 830 and the COT pattern 832 allow the gNB 104 to know at least some times during which the UE 102 should be monitoring the PDCCH, regardless of whether the UE 102 has yet received a WUS or other signal from the gNB 104, and regardless of whether the UE 102 has yet switched from the pre-COT pattern 830 to the COT pattern 832. This gNB 104 can make use of this knowledge when re-transmitting signals indicating the COT 822 to the UE 102, and/or when sending control information to the UE 102, as discussed above in connection with FIGS. 3 and 4.

In some situations, the gNB 104 may transmit to the UE 102 a signal indicating that the UE 102 is to start monitoring the PDCCH according to the pattern 800 instead of the pattern 802, or indicating that the COT 822 has ended. The UE 102 monitors the PDCCH according to the pattern 800 in response to the signal. The UE 102 may start monitoring the PDCCH according to the pattern 800 immediately upon receiving the signal, or may start to monitor the PDCCH according to the pattern 800 after a certain amount of time passes after receiving the signal. The signal may be a DCI, for example. In other situations, if the UE 102 does not receive the signal and knows the end of the COT 822 (e.g., according to a COT structure indication as described for FIG. 4 above), the UE 102 starts monitoring the pattern 800 after the end of the COT 822.

In the examples above, the UE 102 reduces the frequency of monitoring the PDCCH by switching from a pre-COT pattern to a COT pattern. In other implementations, however, the UE 102 can begin to monitor the PDCCH more frequently, rather than less frequently, during the COT. This alternative approach retains the advantage that, if the UE 102 has missed the indication that the COT has started and thus did not switch from the pre-COT pattern to the COT pattern, the gNB 104 nevertheless knows that the UE 102 is monitoring the PDCCH at least during the overlapping occasions (i.e., the occasions of the COT pattern that overlap an occasion of the pre-COT pattern). Moreover, in those cases where the UE 102 does not receive the indication that a COT has started and therefore continues to monitor the PDCCH according to the pre-COT pattern, the reduced frequency of occasions in the pre-COT pattern allows the UE 102 to save power.

Figure 9:
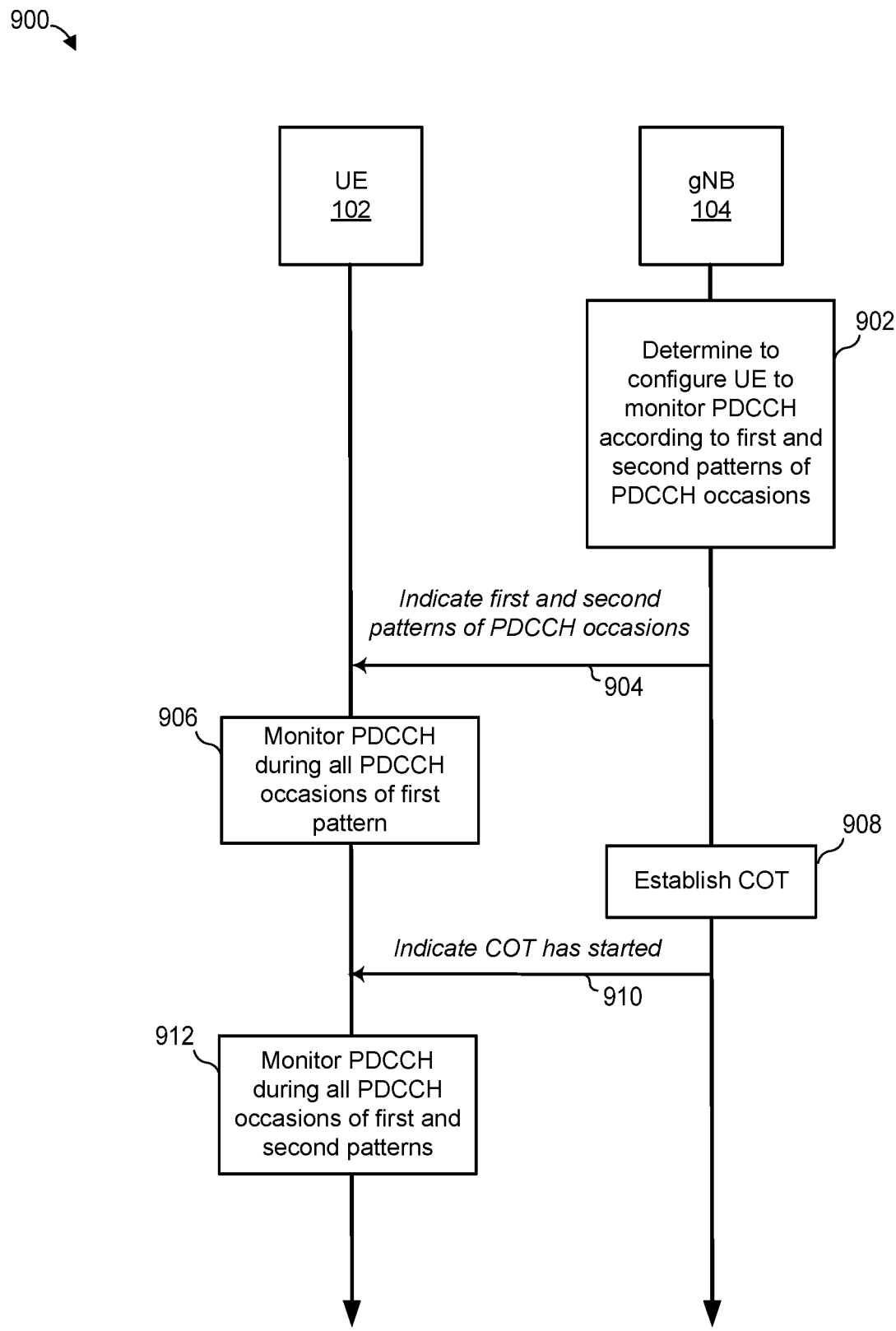
FIG. 9 depicts an example message sequence according to which a base station configures a UE with two patterns, and provides an indication of a time when the UE switches from monitoring a control channel according to the first pattern to monitoring the control channel according to the logical union of the first pattern and the second pattern.
Figure 10:
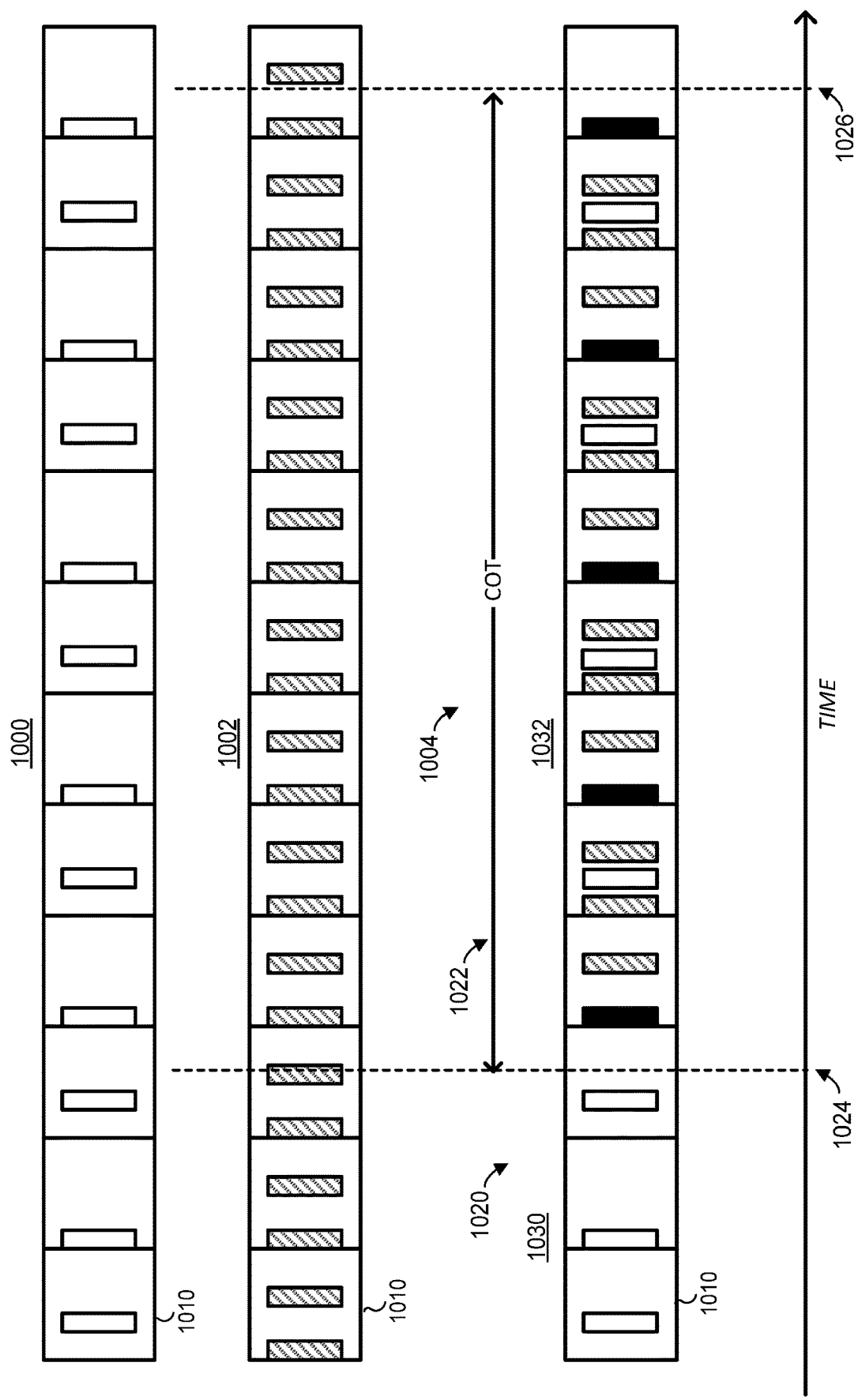
FIG. 10 is a timing diagram of example patterns that can correspond to the message sequence of FIG. 9.

Referring for example to FIGS. 9 and 10, the gNB 104 first determines 902 to configure the UE 102 to monitor a PDCCH according to a first pattern 1000 of PDCCH occasions and a second pattern 1002 of PDCCH occasions. The gNB 104 indicates 904 the patterns 1000 and 1002 to the UE 102, e.g., by transmitting one or more configuration messages to the UE 102 via the shared carrier, as discussed further below. The UE 102 uses these patterns 1000 and 1002 to generate a dynamic monitoring schedule 1004. Similar to the schedule 304 of FIG. 3, the schedule 1004 covers a pre-COT 1020, which is an interval of time before the gNB 104 establishes a COT 1022, and the COT 1022 itself. As seen in FIG. 10, the COT 1022 starts at a time 1024 and ends at a time 1026. During the pre-COT 1020, the UE 102 monitors 906 the PDCCH according to a pre-COT pattern 1030, which in this example is equivalent to the first pattern 1000.

Next, the gNB 104 establishes 908 the COT 1022, and indicates 910 to the UE 102 that the COT 1022 has started. In response to this indication 910, and during the COT 1022, the UE 102 monitors 912 the PDCCH by continuing to monitor the PDCCH according to the first pattern 1000 and also beginning to monitor the PDCCH according to the second pattern 1002. Thus, the COT pattern 1032 in this example is a logical union of the patterns 1000 and 1002.

In some situations, the gNB 104 may transmit to the UE 102 a signal indicating that the UE 102 is to stop monitoring the PDCCH according to the pattern 1002, or indicating that the COT 1022 has ended. The UE 102 monitors the PDCCH according to the pattern 1000 in response to the signal. The UE 102 may stop monitoring the PDCCH according to the pattern 1002 immediately upon receiving the signal, or may stop monitoring the PDCCH according to the pattern 1002 after a certain amount of time passes after receiving the signal. The signal may be a DCI, for example. In other situations, if the UE 102 does not receive the signal and knows the end of the COT 1022 (e.g., according to a COT structure indication as described for FIG. 4 above), the UE 102 stop monitoring the pattern 1002 after the end of the COT 1022.

Figure 11:
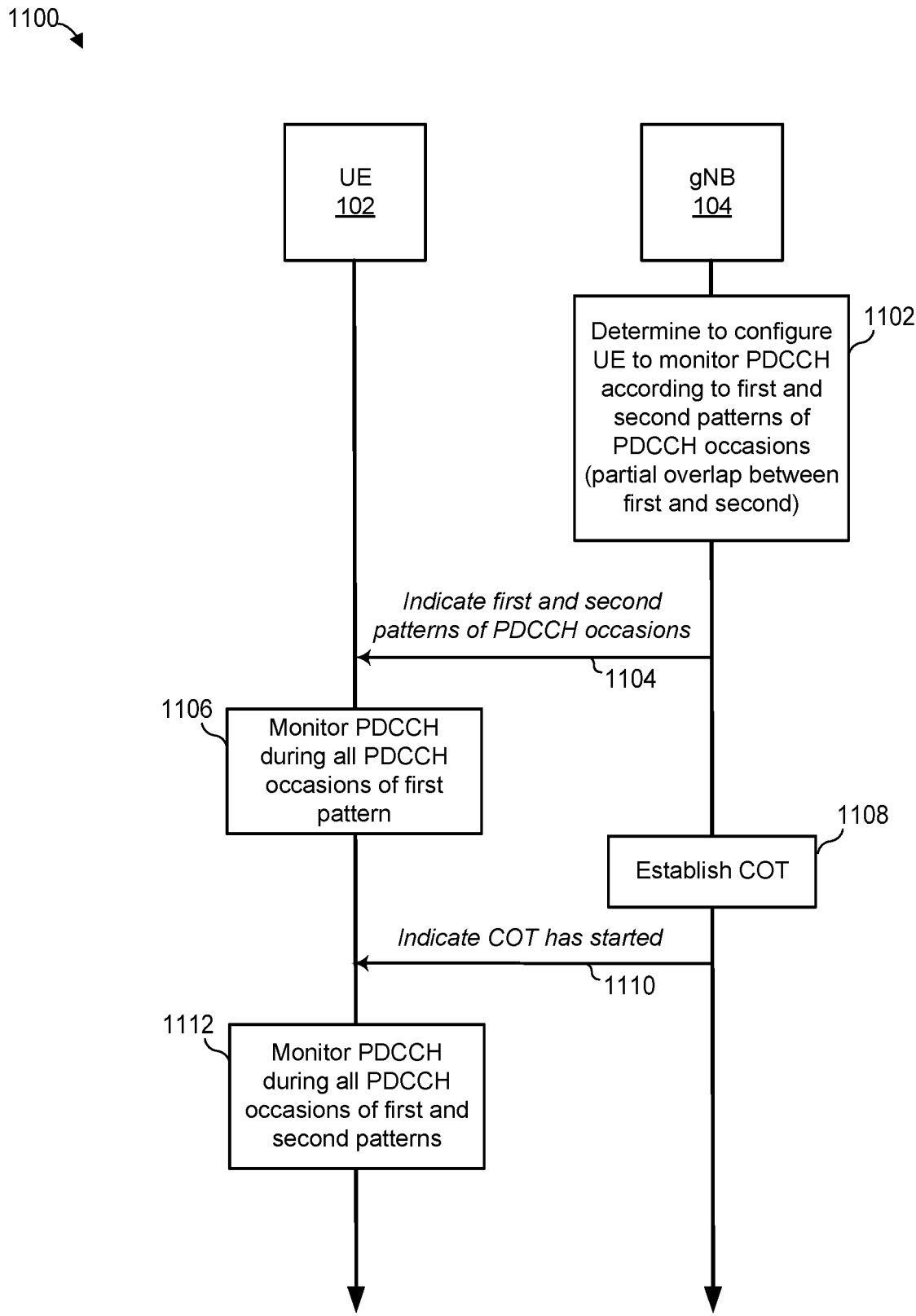
FIG. 11 depicts an example message sequence according to which a base station configures a UE with two partially overlapping patterns, and provides an indication of a time when the UE switches from monitoring a control channel according to the first pattern to monitoring the channel according to the logical union of the two patterns.
Figure 12:
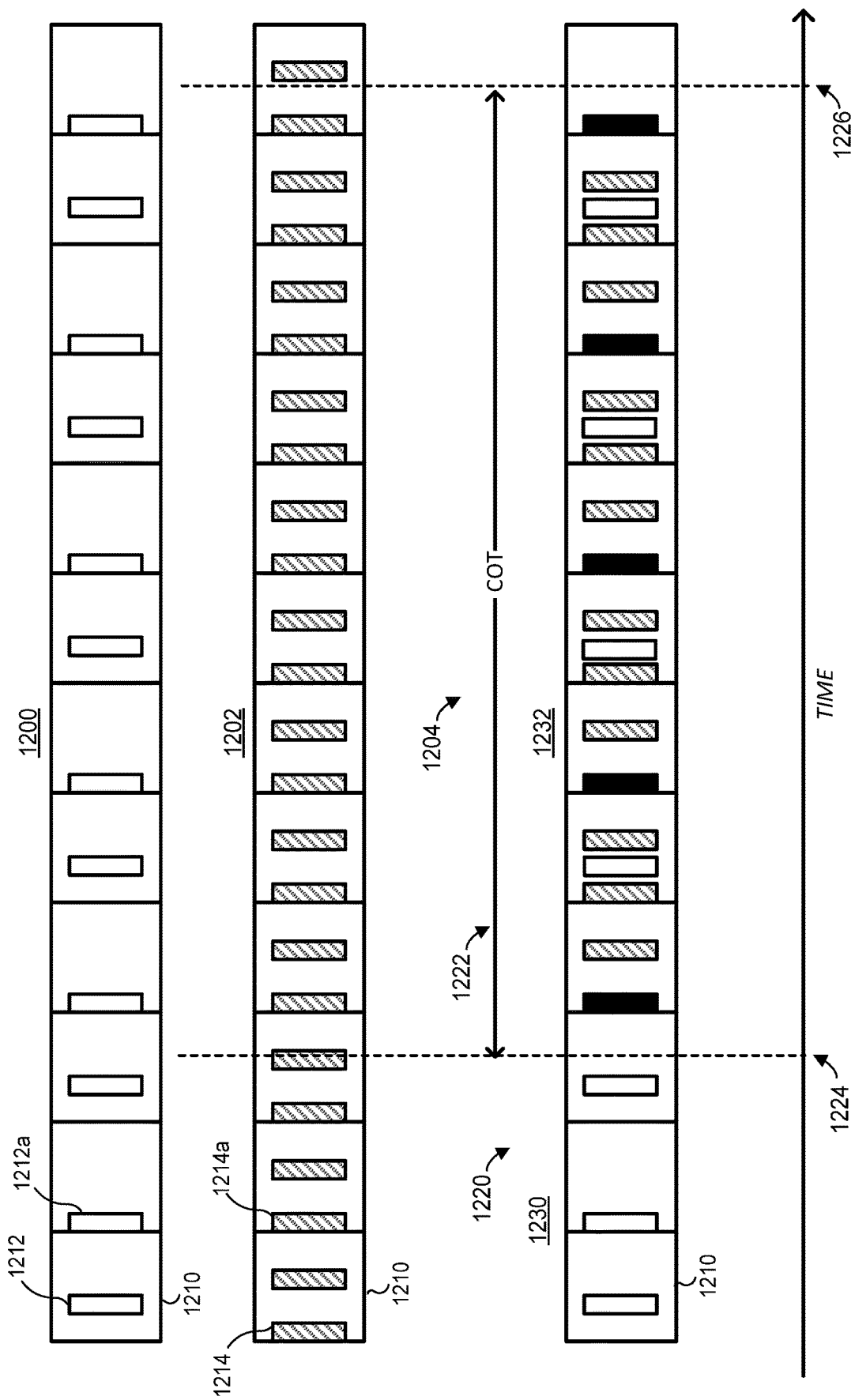
FIG. 12 is a timing diagram of example patterns that can correspond to the message sequence of FIG. 11.

Referring next to FIGS. 11 and 12, the gNB 104 first determines 1102 to configure the UE 102 to monitor a PDCCH according to a first pattern 1200 of PDCCH occasions and a second pattern 1202 of PDCCH occasions. As seen in FIG. 12, the patterns 1200 and 1202 partially overlap, with an occasion 1212*a* of the pattern 1200 coinciding with an occasion 1214*a* of the pattern 1202. Thus, in this example, an overlapping occasion occurs once every two consecutive time units 1210. In other implementations and/or scenarios, the gNB 104 may select or set monitoring patterns 1200 and 1202 such that the overlapping occasions are more or less frequent than shown in FIG. 12.

The gNB 104 indicates 1104 the patterns 1200 and 1202 to the UE 102, e.g., by transmitting one or more configuration messages to the UE 102 via the shared carrier, as discussed further below. The UE 102 uses these patterns 1200 and 1202 to generate a dynamic monitoring schedule 1204. Similar to the schedule 304 of FIG. 3, the schedule 1204 covers a pre-COT 1220, which is an interval of time before the gNB 104 establishes a COT 1222, and the COT 1222 itself. As seen in FIG. 12, the COT 1222 starts at a time 1224 and ends at a time 1226. During the pre-COT 1220, the UE 102 monitors 1106 the PDCCH according to a pre-COT pattern 1230, which in this example is equivalent to the first pattern 1200.

Next, the gNB 104 establishes 1108 the COT 1222, and indicates 1110 to the UE 102 that the COT 1222 has started. In response to this indication 1110, and during the COT 1222, the UE 102 monitors 1112 the PDCCH by continuing to monitor the PDCCH according to the first pattern 1200 and also beginning to monitor the PDCCH according to the second pattern 1202. Thus, the COT pattern 1232 in this example is a logical union of the patterns 1200 and 1202. In another example, the COT pattern 1232 is simply the second pattern 1202.

In some situations, the gNB 104 may transmit to the UE 102 a signal indicating that the UE 102 is to stop monitoring the PDCCH according to the pattern 1202, or indicating that the COT 1222 has ended. The UE 102 monitors the PDCCH according to the pattern 1200 in response to the signal. The UE 102 may stop monitoring the PDCCH according to the pattern 1202 immediately upon receiving the signal, or may stop monitoring the PDCCH according to the pattern 1202 after a certain amount of time passes after receiving the signal. The signal may be a DCI, for example. In other situations, if the UE 102 does not receive the signal and knows the end of the COT 1222 (e.g., according to a COT structure indication as described for FIG. 4 above), the UE 102 stops monitoring the pattern 1202 after the end of the COT 1222.

Figure 13:
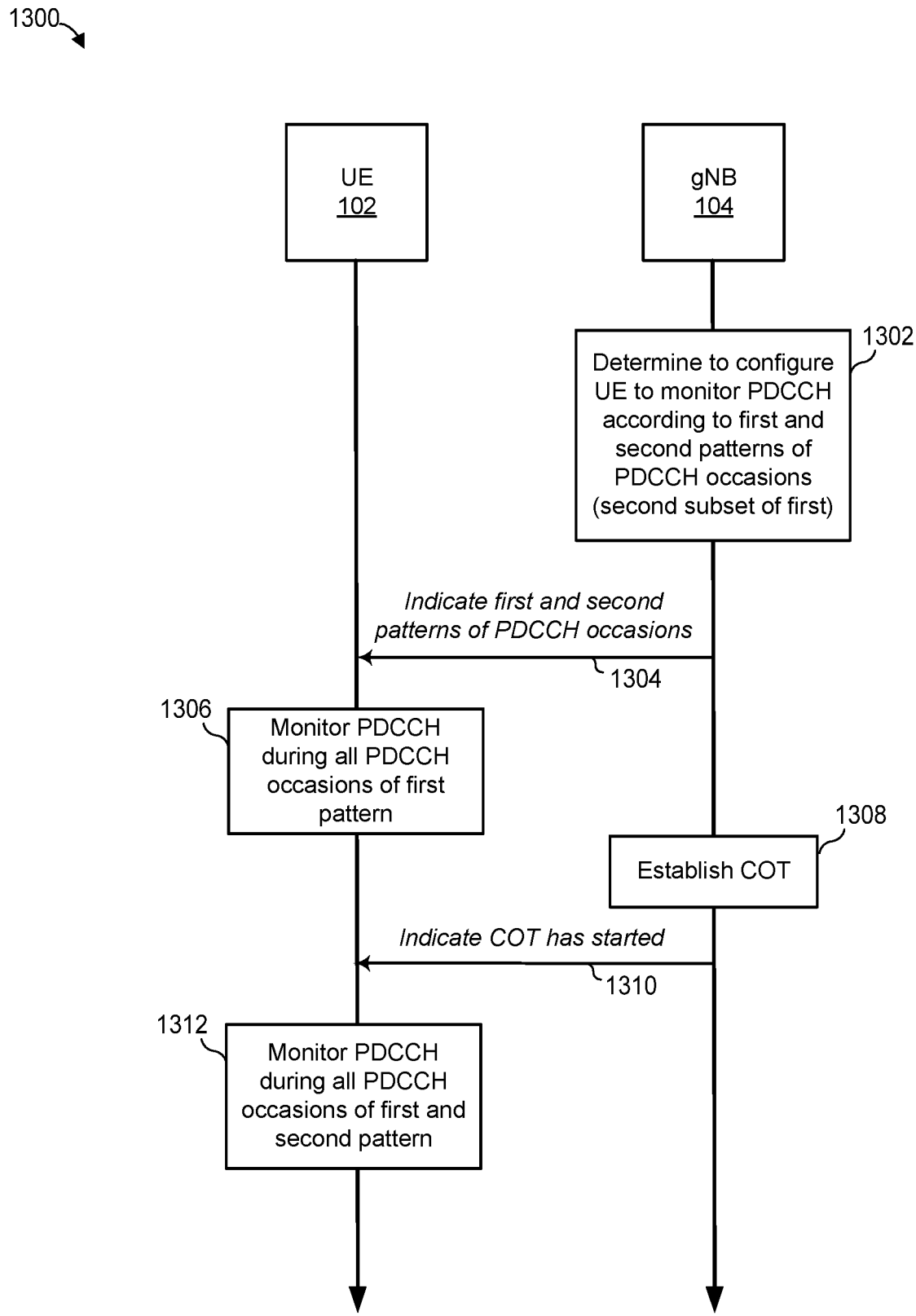
FIG. 13 depicts an example message sequence according to which a base station configures a UE with a first pattern and a second pattern that is a subset of the first pattern, and provides an indication of a time when the UE switches from monitoring a control channel according to the first pattern to monitoring the channel according to the logical union of the two patterns.
Figure 14:
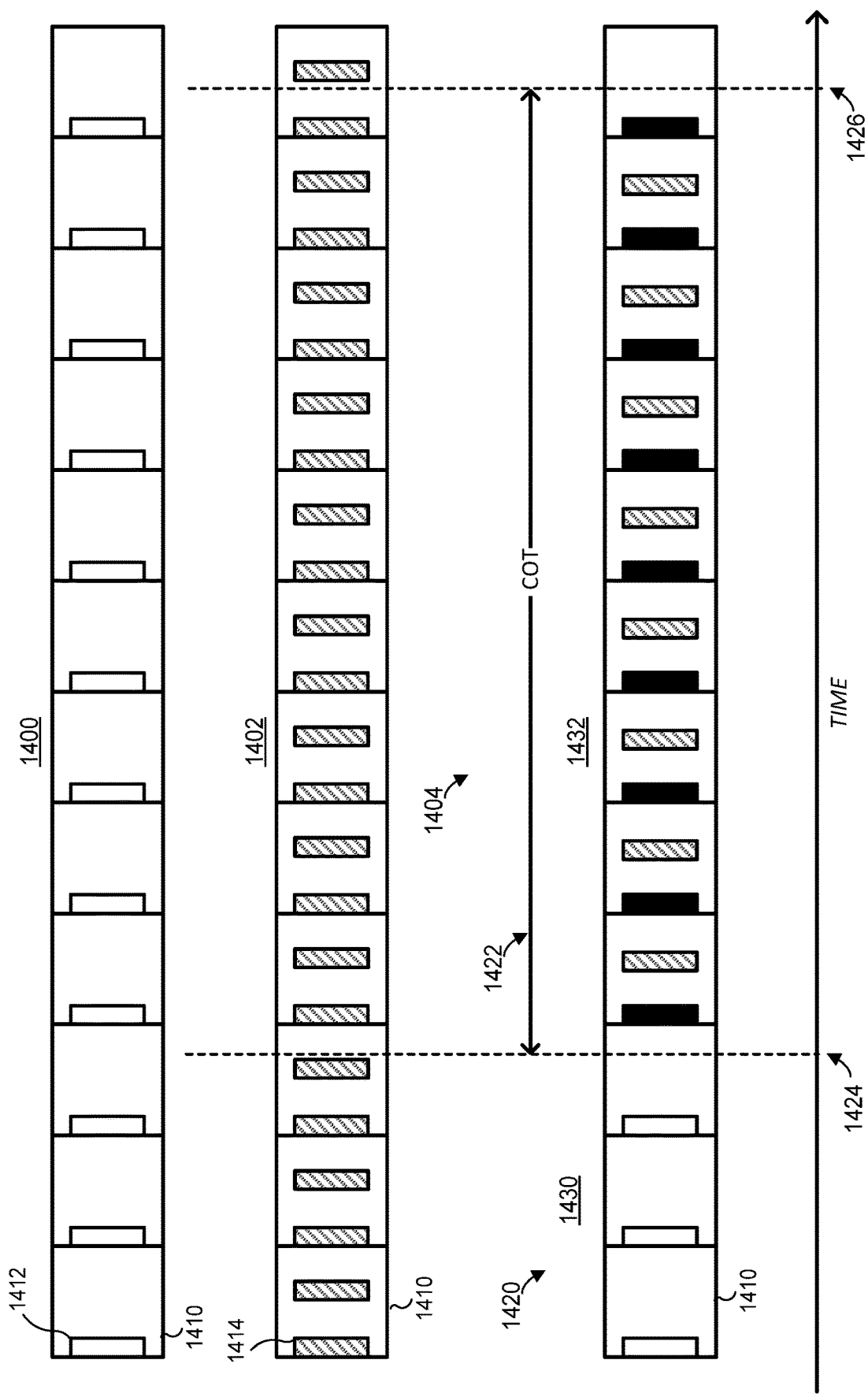
FIG. 14 is a timing diagram of example patterns that can correspond to the message sequence of FIG. 13.

Referring next to FIGS. 13 and 14, the gNB 104 first determines 1302 to configure the UE 102 according to a first pattern 1400 of PDCCH occasions and a second pattern 1402 of PDCCH occasions, with the pattern 1400 being a subset of the pattern 1402. As illustrated in FIG. 14, occasion 1412 of pattern 1400 coincides with the first occasion 1414 of pattern 1402 in each time unit 1410. However, the pattern 1402 includes a second occasion in each time unit 120 that is not present in the pattern 1400.

The gNB 104 indicates 1304 the patterns 1400 and 1402 to the UE 102. The UE 102 uses the patterns 1400 and 1402 to generate a dynamic monitoring schedule 1404. Similar to the schedule 304 of FIG. 2, the schedule 1404 covers a pre-COT 1420, which is an interval of time before the gNB 104 establishes a COT 1422, and the COT 1422 itself. As seen in FIG. 14, the COT 1422 starts at a time 1424 and ends at a time 1426. During the pre-COT 1420, the UE 102 monitors 1306 the PDCCH according to a pre-COT pattern 1430, which in this example is the first pattern 1400.

Next, the gNB 104 establishes 1308 the COT 1422, and indicates 1310 to the UE 102 that the COT 1422 has started. In response to this indication 1310, and during the COT 1422, the UE 102 monitors 1312 the PDCCH by continuing to monitor according to the first pattern 1400, and beginning to also monitor according to the second pattern 1402 (i.e., by monitoring according to the logical union of the patterns 1400 and 1402). Because the pattern 1400 is a subset of the pattern 1402, the COT pattern 1430 is also equivalent to the pattern 1402.

In some situations, the gNB 104 may transmit to the UE 102 a signal indicating that the UE 102 is to stop monitoring the PDCCH according to the pattern 1402, or indicating that the COT 1422 has ended. The UE 102 monitors the PDCCH according to the pattern 1400 in response to the signal. The UE 102 may stop monitoring the PDCCH according to the pattern 1402 immediately upon receiving the signal, or may stop monitoring the PDCCH according to the pattern 1402 after a certain amount of time passes after receiving the signal. The signal may be a DCI, for example. In other situations, if the UE 102 does not receive the signal and knows the end of the COT 1422 (e.g., according to a COT structure indication as described for FIG. 4 above), the UE 102 stops monitoring the PDCCH according to the pattern 1402 after the end of the COT 1422.

Various, more specific implementations are now discussed with reference to the example scenarios of FIGS. 2-14 discussed above.

In some implementations and/or scenarios, the control channel the UE 102 monitors may be a GC-PDCCH rather than a PDCCH. When the control channel is a GC-PDCCH, the gNB 104 can configure the UE 102 with a certain group-common radio network temporary identifier (GC-RNTI), which the UE 102 can use to monitor the GC-PDCCH. For example, the UE 102 can monitor the GC-PDCCH during PDCCH occasions according to the pre-COT pattern 330, 630, 830, 1030, 1230, or 1430. Alternatively, the UE 102 can monitor the GC-PDCCH according to the pattern 300, 600, 800, 1000, 1200, or 1400, or according to the pattern 302, 602, 802, 1002, 1202, or 1402. As another example, the gNB 104 can configure the UE 102 specifically with GC-PDCCH occasions using a SearchSpace information element (IE), or another suitable indication of a search space configuration.

In the example scenarios of FIGS. 2-14, the gNB 104 indicates 204, 504, 704, 904, 1104, 1304 first and second patterns to the UE 102 using one or more configuration messages. In one implementation, the gNB 104 transmits an RRC message that indicates the patterns, such as RRC Reconfiguration, RRC Setup, or RRC Resume, for example. A configuration message also can include at least one DCI, and/or a MAC control element (CE). For each of the patterns 300/302, 600/602, 800/802, 1000/1002, 1200/1202, and 1400/1402, the DCI, MAC CE, or other confirmation message may indicate the separation in time between consecutive PDCCH occasions for each pattern, the duration of each PDCCH occasion in the patterns, and so on. In response to the one or more configuration messages, the UE 102 may transmit one or more messages, such as a MAC confirmation CE, for example. In another implementation and/or scenario, the UE 102 transmits to the gNB 104 a physical uplink control channel (PUCCH) indication in response to the one or more configuration messages from the gNB 104.

Further, the one or more configuration messages may include a CORESET to indicate a time-frequency resource allocated to the UE 102. For example, the configuration message(s) may indicate a certain frequency resource (e.g., one or more frequency ranges) for a certain time duration (e.g., one, two, or three OFDM symbols) during which the UE 102 is to search for a DCI. The gNB 104 may use a ControlResourceSet IE, for example, to transmit this configuration to the UE 102. The gNB 104 in one example configuration provides a CORESET that applies to both patterns in each pair 300/302, 600/602, 800/802, 1000/1002, 1200/1202, or 1400/1402. Thus, when the UE 102 monitors a control channel according to one pattern or the other pattern, the UE 102 during a PDCCH occasion searches for a DCI in accordance with the CORESET information. In another implementation, however, the gNB 104 provides a separate CORESET for each of the two patterns in the pair 300/302, 600/602, 800/802, 1000/1002, 1200/1202, or 1400/1402. In this implementation, the UE 102 searches for a DCI in accordance with a first CORESET during PDCCH occasions associated with the first pattern and a different, second CORESET during PDCCH occasions associated with the second pattern.

As one particular example, the gNB 104 may transmit to the UE 102 an RRC message that includes two search space configurations (e.g., two SearchSpace IEs) and two CORESET configurations (e.g., two ControlResourceSet IEs). Alternatively, the gNB 104 may transmit to the UE 102 a first RRC message that includes a first search space configuration and a corresponding CORESET, and a second RRC message that includes a different, second search space configuration and a corresponding CORESET. As in the implementations described above, the gNB 104 may use SearchSpace and ControlResourceSet IEs to provide the search space configurations and CORESETs. The two CORESETs the gNB 104 provides in this implementation may be the same or different. As yet another example, the gNB 104 may transmit to the UE 102 three RRC messages as part of the configuration: a first RRC message that includes a first search space configuration, a second RRC message that includes a second search space configuration, and a third RRC message that includes a CORESET for use with the two patterns (or, two CORESETs for use with the respective patterns).

As discussed above, the gNB 104 in some cases transmits a WUS or COT indicator. The WUS or the COT indicator may include a preamble, a Zadoff-Chu (ZC) sequence, a synchronization signal (SS), a primary SS, a secondary SS, a reference signal (RS) such as a channel state information SS (CSI-RS), a demodulation reference signal (DMRS) in a PDCCH or a DMRS in a GC-PDCCH, and/or a DCI in a PDCCH. In general, the WUS or COT indicator may depend on the implementation of the gNB 104, or the gNB 104 may be able to select a different WUS or COT indicator depending on the capability of the UE 102 and/or the configuration of the NR-U cell 106.

In addition to using a WUS or COT indicator to notify the UE 102 that the COT 322, 622, 822, 1022, 1222, or 1422 has started, the gNB 104 may transmit a WUS to the UE 102 to cause the UE 102 to start monitoring the PDCCH occasions according to the pre-COT pattern 330, 630, 830, 1030, 1230, or 1430. For example, the UE 102 may not monitor any PDCCH occasions until first receiving a WUS from the gNB 104. In other implementations, the UE 102 may monitor PDCCH occasions according to the pre-COT pattern 330, 630, 830, 1030, 1230, or 1430 regardless of whether the UE 102 has received a WUS from the gNB 104.

As was also discussed above, the gNB 104 in some implementations provides to the UE 102 a COT structure indication that indicates the ending time and/or the duration of the COT 322, 622, 822, 1022, 1222, or 1422. For example, the COT structure indication may indicate the COT ending time or duration as X (e.g., 1, 2, 3, . . . N, where N is a positive integer) time units (e.g., OFDM symbols, slots, subframes, frames) relative to a certain starting time that the UE 102 knows a priori or can otherwise determine. As a more specific example, the starting time may be the time unit during which the UE 102 receives the COT structure indication. Thus, if the UE 102 receives the COT during the Y-th time unit, and the COT structure indicates a COT duration of X, the UE 102 can determine that the COT lasts from the Y-th time unit until the (X+Y)-th time unit. As another example, the starting time can occur n time units after the UE 102 receives the COT structure indication, and both the UE 102 and the gNB 104 can store the same value of n. The UE 102 in this case can determine that the COT lasts from the (Y+n)-th time unit until the (X+Y+n)-th time unit.

Moreover, the gNB 104 in some cases can transmit multiple instances of the COT structure indication, and vary the content of the indication according to the remaining duration of the COT 322, 622, 822, 1022, 1222, or 1422 (e.g., as discussed above in connection with FIG. 4). For example, the gNB 104 in the first instance may transmit a COT structure indication according to which the COT is Y time units long. In the second instance that occurs L time units later, however, the gNB 104 may transmit a COT structure indication according to which the remaining duration of the COT is Y-L time units. Similar to the examples above, the values of Y and L can be 1, 2, 3, or any other suitable positive integer. Also similar to the examples above, the COT structure indication may reference the duration of a COT and/or the ending time of the COT relative to a starting time of which the UE 102 is aware (e.g., based on the 3GPP specification or an explicit indication from the gNB 104). The gNB 104 in some implementations transmits the multiple instances of the COT structure indication during the monitoring occasions of the pre-COT pattern, or more specifically during the monitoring occasions of the pre-COT and COT patterns that overlap each other.

In implementations where the gNB 104 indicates 310, 510, 710, 910, 1110, or 1310 the duration of the COT 322, 622, 822, 1022, 1222, or 1422 in a broadcast message, the broadcast message may be a system information block (SIB), or a dedicated message such as RRC Setup, RRC Resume, RRC Reestablishment, or RRC Reconfiguration, for example. In yet another implementation, each of the UE 102 and the gNB 104 stores a predefined duration of the COT in a respective local memory.

In some implementations where the UE 102 and the gNB 104 can use a GC-PDCCH, the gNB 104 in various scenarios may transmit a COT structure indication on a PDCCH or a GC-PDCCH, during either a PDCCH occasion or a GC-PDCCH occasion. As one example, the gNB 104 transmits a COT structure indication on a PDCCH during a PDCCH occasion of the pre-COT pattern 330, 630, 830, 1030, 1230, or 1430. As another example, the gNB 104 transmits a COT structure indication on a GC-PDCCH during a PDCCH occasion of the pre-COT pattern 330, 630, 830, 1030, 1230, or 1430. As yet another example, the gNB 104 transmits a COT structure indication on a GC-PDCCH during a GC-PDCCH occasion of the pre-COT pattern 330, 630, 830, 1030, 1230, or 1430 or another pattern of GC-PDCCH occasions.

The gNB 104 may transmit a DCI during a PDCCH occasion, and include the COT indication in the DCI. In other implementations, the gNB 104 transmits a COT structure indication in a MAC protocol data unit (PDU). The COT structure indication may be a MAC CE in a MAC PDU, for example. As one alternative, the COT structure indication may be an RRC IE in an RRC message, and the gNB 104 includes the RRC message in a MAC PDU.

When the gNB 104 in the examples above establishes the COT 322, 622, 822, 1022, 1222, or 1422, the gNB 104 successfully completes a channel access procedure, such as an LBT procedure, on the shared carrier. The gNB 104 as a result acquires a grant to the channel.

When the gNB 104 uses a WUS or a COT indicator to notify the UE 102 that the UE 102 should start monitoring the PDCCH according to the corresponding COT pattern, the gNB 104 may notify the UE 102 of the duration of the COT 322, 622, 822, 1022, 1222, or 1422 prior to transmitting the WUS or the COT indicator. To this end, the gNB 104 can use a COT structure indication. However, if the UE 102 and the gNB 104 are already are aware of a predefined duration of the COT, the gNB 104 need not transmit a COT structure indication or another indicator of the duration of the COT.

In some implementations, the gNB 104 transmits a WUS to the UE 102 to cause the UE 102 to begin monitoring the PDCCH according to the pre-COT pattern 330, 630, 830, 1030, 1230, or 1430, during the pre-COT time 320, 620, 820, 1020, 1220, or 1420. The gNB 104 may then transmits a COT structure indication during one of the PDCCH occasions of the pre-COT pattern. In another implementation, the gNB 104 transmits a COT structure indication during one of the PDCCH occasions of the pre-COT pattern without transmitting a WUS prior to transmitting the COT structure indication.

The pre-COT 320, 620, 820, 1020, 1220, or 1420, in various implementations or scenarios, may begin immediately after the UE 102 receives the indication 204, 504, 704, 904, 1104, or 1304 of the first and second patterns, or at some point after the UE 102 receives this indication. Moreover, the gNB 104 may provide the indication of the first pattern and the second pattern in different configuration messages at different times.

As described above, the pre-COT ends, and the COT 322, 622, 822, 1022, 1222, or 1422 begins, at the instant when the gNB 104 establishes the COT. More generally, however, the COT start times 324, 624, 824, 1024, 1224, and 1424 need not correspond precisely to the beginning of the COT. For example, the COT start time, for purposes of the UE 102 changing its monitoring pattern, may be the time when the UE 102 receives the indication 210, 510, 710, 910, 1110, or 1310 that the gNB 104 has established the COT, or another suitable time.

In some implementations, the schedule 304, 604, 804, 1001, 1204, or 1404 includes at least one control channel occasion that is not a part of the corresponding pattern pair 300/302, 600/602, 800/802, 1000/1002, 1200/1202, or 1400/1402. In some embodiments where the gNB 104 transmits a WUS to the UE 102 to indicate the start of a COT, for example, the UE 102 monitors the control channel immediately (or almost immediately) upon receiving the WUS, even if that time does not correspond to a control channel occasion of either pattern in the pair. Thus, for example, the UE 102 may monitor the PDCCH or GC-PDCCH for a time duration starting at (or very near to) time 324, 624, 824, 1024, 1224, or 1424. This "extra" monitoring occasion may have the same duration as the other occasions of the pattern pair, or may have a different duration.

Some example methods that can be implemented in devices operating in the wireless communication network 100, or another suitable network, are now considered. These methods can be implemented in processing hardware, e.g., as software instructions executable on one or more processors.

Figure 15:
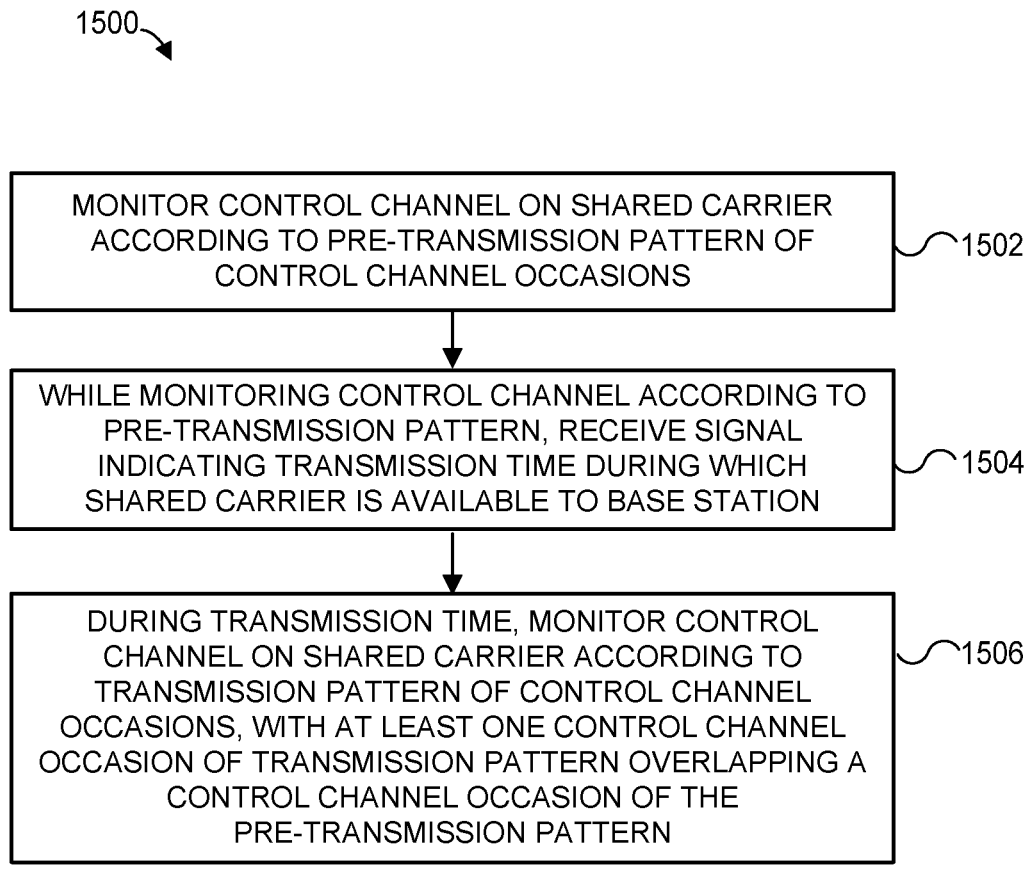
FIG. 15 is a flow diagram of an example method for monitoring a control channel, which can be implemented in the user device of FIG. 1.

FIG. 15 illustrates an example method 1500 for monitoring a control channel (e.g., PDCCH or GC-PDCCH). The method 1500 is implemented in a user device such as the UE 102, for example (e.g., by the control channel monitoring module 122).

At block 1502, the user device monitors the control channel on a shared carrier (e.g., monitoring 206 in FIG. 2, monitoring 506 in FIG. 5, monitoring 706 in FIG. 7, monitoring 906 in FIG. 9, monitoring 1106 in FIG. 11, or monitoring 1306 in FIG. 13), according to a pre-transmission pattern of control channel occasions. The pre-transmission may be the pattern 330 of FIG. 3, the pattern 630 of FIG. 6, the pattern 830 of FIG. 8, the pattern 1030 of FIG. 10, the pattern 1230 of FIG. 12, or the pattern 1430 of FIG. 14, for example.

At block 1504, while monitoring the control channel according to the pre-transmission pattern of control channel occasions, the user device receives a signal indicating a transmission time (e.g., COT) during which the gNB 104 has access to the shared carrier (e.g., indication 210 in FIG. 2, indication 510 in FIG. 5, indication 710 in FIG. 7, indication 910 in FIG. 9, indication 1110 in FIG. 11, or indication 1310 in FIG. 13). The gNB 104 may have sought access to the shared carrier (e.g., using an LBT procedure) in order to transmit information such as DCI and/or other control data to the UE 102.

At block 1506, the user device monitors the control channel on the shared carrier (e.g., monitoring 212 in FIG. 2, monitoring 512 in FIG. 5, monitoring 712 in FIG. 7, monitoring 1112 in FIG. 11, or monitoring 1312 in FIG. 13), according to a transmission pattern of control channel occasions (e.g., COT pattern 332 in FIG. 3, COT pattern 632 in FIG. 6, COT pattern 832 in FIG. 8, COT pattern 1032 in FIG. 10, COT pattern 1232 in FIG. 12, or COT pattern 1432 in FIG. 14). At least one control channel occasion of the transmission pattern overlaps a control channel occasion of the pre-transmission pattern.

Figure 16:
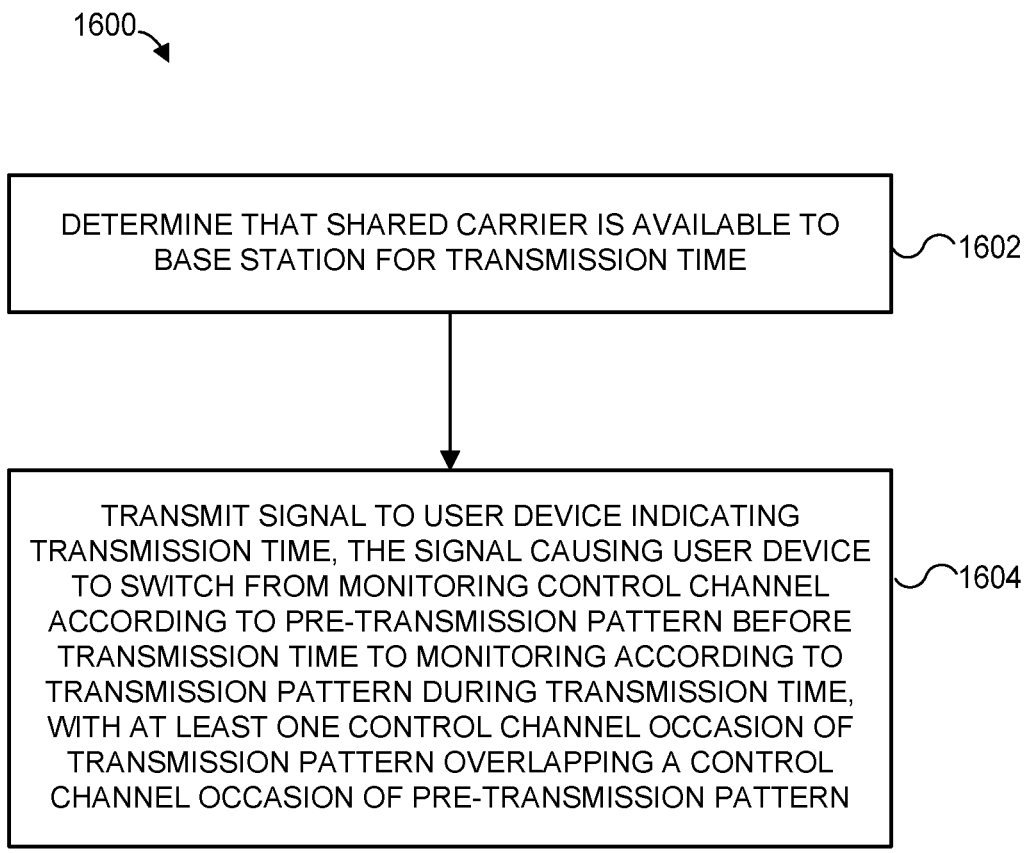
FIG. 16 is a flow diagram of an example method for configuring a user device to monitor a control channel, which can be implemented in the base station of FIG. 1.

FIG. 16 illustrates an example method 1600 for configuring a user device to monitor a control channel (e.g., PDCCH or GC-PDCCH). The method 1600 is implemented in a base station such as the gNB 104, for example (e.g., by the components 132-136).

At block 1602, the base station determines that a shared carrier is available to the base station for a certain transmission time. Block 1602 may include performing a successful LBT procedure to establish a COT, for example (e.g., establishing 208 in FIG. 2, establishing 508 in FIG. 5, establishing 708 in FIG. 7, establishing 908 in FIG. 9, establishing 1108 in FIG. 11, or establishing 1308 in FIG. 13).

At block 1604, the base station transmits a signal to the user device indicating a transmission time during which the shared carrier is available to the base station. The signal causes the user device to switch from monitoring a control channel on the shared carrier according to a pre-transmission pattern of control channel occasions before the transmission time (e.g., the monitoring 204 in FIG. 2, the monitoring 504 in FIG. 5, the monitoring 704 in FIG. 7, the monitoring 904 in FIG. 9, the monitoring 1104 in FIG. 11, or the monitoring 1304 in FIG. 13, according to the pattern 330 of FIG. 3, the pattern 630 of FIG. 6, the pattern 830 of FIG. 8, the pattern 1030 of FIG. 10, the pattern 1230 of FIG. 12, or the pattern 1430 of FIG. 14, respectively) to monitoring the control channel on the shared carrier according to a transmission pattern of control channel occasions during the transmission time (e.g., the monitoring 212 in FIG. 2, the monitoring 512 in FIG. 5, the monitoring 712 in FIG. 7, the monitoring 904 in FIG. 9, the monitoring 1112 in FIG. 11, or the monitoring 1312 in FIG. 13, according to the COT pattern 332 of FIG. 3, the COT pattern 632 of FIG. 6, the COT pattern 832 of FIG. 8, the COT pattern 1032 of FIG. 10, the COT pattern 1232 of FIG. 12, or the COT pattern 1432 of FIG. 14, respectively). The transmission pattern is different than the pre-transmission pattern, but includes at least one control channel occasion that overlaps a control channel occasion of the pre-transmission pattern.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain implementations are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate, through the principles disclosed herein, still additional alternative structural and functional designs for scheduling control channel information. Thus, while particular implementations and applications have been illustrated and described, it is to be understood that the disclosed implementations are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method, in a user device, of obtaining control channel information from a base station that communicates with the user device via a shared carrier, the method comprising:
receiving, from the base station via the shared carrier, a first search space configuration indication indicating a pre-transmission pattern of control channel occasions, each control channel occasion of the pre-transmission pattern of control channel occasions being a respective time window in which the user device is to monitor a control channel on the shared carrier;
receiving, from the base station via the shared carrier, a second search space configuration indication indicating a transmission pattern of control channel occasions that is different than the pre-transmission pattern, but includes at least one control channel occasion that overlaps a control channel occasion of the pre-transmission pattern and includes more or fewer control channel occasions per unit time than the pre-transmission pattern, each control channel occasion of the transmission pattern of control channel occasions being a respective time window in which the user device is to monitor the control channel on the shared carrier;
monitoring the control channel on the shared carrier according to the pre-transmission pattern;
while monitoring the control channel according to the pre-transmission pattern, receiving, from the base station via the shared carrier, a downlink control information, DCI, indicating that the user device is to start monitoring according to the transmission pattern; and
in response to receiving the DCI, monitoring, during a transmission time in which the shared carrier is available to the base station, the control channel on the shared carrier according to the transmission pattern.

2. The method of claim 1, wherein receiving the first and second search space configuration indications includes receiving one or more messages, the one or more messages comprising:
one or more radio resource control (RRC) messages;
one or more DCIs; or
one or more messages including medium access control (MAC) control elements.

3. The method of claim 2, wherein:
receiving the one or more messages includes receiving an indication of a first time-frequency resource and an indication of a second time-frequency resource;
monitoring the control channel during control channel occasions of the pre-transmission pattern includes monitoring the control channel using the first time-frequency resource; and
monitoring the control channel during control channel occasions of the transmission pattern includes monitoring the control channel using the second time-frequency resource.

4. The method of claim 1, further comprising:
after receiving the DCI, and before monitoring the control channel according to the transmission pattern, monitoring, during the transmission time, the control channel on the shared carrier according to the pre-transmission pattern for either (i) a predetermined number of control channel occasions, or (ii) a number of control channel occasions indicated in a message that the user device received from the base station.

5. The method of claim 1, further comprising, before receiving the DCI, receiving, from the base station via the shared carrier, a signal that causes the user device to enter a mode in which the user device can decode the control channel information.

6. The method of claim 1, wherein the DCI further indicates one or more of (i) that the transmission time has started, (ii) a duration of the transmission time, or (iii) an ending of the transmission time.

7. The method of claim 1, wherein receiving the DCI is a retransmission of an earlier DCI, and wherein the DCI indicates a remaining duration of the transmission time.

8. A method, in a base station, of providing control channel information to a user device that communicates with the base station via a shared carrier, the method comprising:
transmitting, to the user device via the shared carrier, a first search space configuration indication indicating a pre-transmission pattern of control channel occasions, each control channel occasion of the pre-transmission pattern of control channel occasions being a respective time window in which the user device is to monitor a control channel on the shared carrier;
transmitting, to the user device via the shared carrier, a second search space configuration indication indicating a transmission pattern of control channel occasions that is different than the pre-transmission pattern, but includes at least one control channel occasion that overlaps a control channel occasion of the pre-transmission pattern and includes more or fewer control channel occasions per unit time than the pre-transmission pattern, each control channel occasion of the transmission pattern of control channel occasions being a respective time window in which the user device is to monitor the control channel on the shared carrier;
determining, using a channel access procedure, that the shared carrier is available to the base station for a transmission time; and
transmitting to the user device a downlink control information, DCI, indicating that the user device is to start monitoring according to the transmission pattern, the DCI causing the user device to switch from (i) monitoring the control channel on the shared carrier according to the pre-transmission pattern before the transmission time to (ii) monitoring the control channel on the shared carrier according to the transmission pattern during the transmission time.

9. The method of claim 8, further comprising:
transmitting at least a portion of the control channel information to the user device via the shared carrier during at least one control channel occasion in the transmission pattern.

10. The method of claim 8, wherein the DCI indicates one or more of (i) that the transmission time has started, (ii) a duration of the transmission time, or (iii) an ending of the transmission time.

11. The method of claim 8, wherein the DCI is a first DCI that indicates the transmission time, and further comprising:
transmitting to the user device a second DCI indicating a remaining duration of the transmission time.

12. The method of claim 8, wherein:
transmitting the first and second search space configuration indications to the user device includes transmitting an indication of a first time-frequency resource and an indication of a second time-frequency resource to the user device;

monitoring the control channel during control channel occasions of the pre-transmission pattern causes the user device to monitor the control channel using the first time-frequency resource; and monitoring the control channel during control channel occasions of the transmission pattern causes the user device to monitor the control channel using the second time-frequency resource.

13. The method of claim 8, wherein transmitting the first and second search space configuration indications to the user device includes:

transmitting one or more radio resource control (RRC) messages to the user device;

transmitting one or more DCIs to the user device; or transmitting one or more messages including medium access control (MAC) control elements to the user device.

14. A user device comprising processing hardware and configured to:

receive, from a base station via a shared carrier, a first search space configuration indication indicating a pre-transmission pattern of control channel occasions, each control channel occasion of the pre-transmission pattern of control channel occasions being a respective time window in which the user device is to monitor a control channel on the shared carrier;

receive, from the base station via the shared carrier, a second search space configuration indication indicating a transmission pattern of control channel occasions that is different than the pre-transmission pattern, but includes at least one control channel occasion that overlaps a control channel occasion of the pre-transmission pattern and includes more or fewer control channel occasions per unit time than the pre-transmission pattern, each control channel occasion of the transmission pattern of control channel occasions being a respective time window in which the user device is to monitor the control channel on the shared carrier;

monitor the control channel on the shared carrier according to the pre-transmission pattern;

while monitoring the control channel according to the pre-transmission pattern, receive, from the base station via the shared carrier, a downlink control information, DCI, indicating that the user device is to start monitoring according to the transmission pattern; and in response to receiving the DCI and during a transmission time in which the shared carrier is available to the base station, monitor the control channel on the shared carrier according to the transmission pattern.

15. The user device of claim 14, wherein receiving the first and second search space configuration indications includes receiving one or more messages, the one or more messages comprising:

one or more radio resource control (RRC) messages;

one or more DCIs; or one or more messages including medium access control (MAC) control elements.

16. The user device of claim 15, wherein:

receiving the one or more messages includes receiving an indication of a first time-frequency resource and an indication of a second time-frequency resource;

monitoring the control channel during control channel occasions of the pre-transmission pattern includes monitoring the control channel using the first time-frequency resource; and monitoring the control channel during control channel occasions of the transmission pattern includes monitoring the control channel using the second time-frequency resource.

17. The user device of claim 14, wherein the user device is further configured to:

after receiving the DCI, before monitoring the control channel according to the transmission pattern, and during the transmission time, monitor the control channel on the shared carrier according to the pre-transmission pattern for either (i) a predetermined number of control channel occasions, or (ii) a number of control channel occasions indicated in a message that the user device received from the base station.

18. The user device of claim 14, wherein the user device is further configured to:

before receiving the DCI, receive, from the base station via the shared carrier, a signal that causes the user device to enter a mode in which the user device can decode the control channel information.

19. The user device of claim 14, wherein the DCI further indicates one or more of (i) that the transmission time has started, (ii) a duration of the transmission time, or (iii) an ending of the transmission time.

20. The user device of claim 14, wherein receiving the DCI is a retransmission of an earlier DCI, and wherein the DCI indicates a remaining duration of the transmission time.

21. A base station comprising processing hardware and configured to:

transmit, to a user device via a shared carrier, a first search space configuration indication indicating a pre-transmission pattern of control channel occasions, each control channel occasion of the pre-transmission pattern of control channel occasions being a respective time window in which the user device is to monitor a control channel on the shared carrier;

transmit, to the user device via the shared carrier, a second search space configuration indication indicating a transmission pattern of control channel occasions that is different than the pre-transmission pattern, but includes at least one control channel occasion that overlaps a control channel occasion of the pre-transmission pattern and includes more or fewer control channel occasions per unit time than the pre-transmission pattern, each control channel occasion of the transmission pattern of control channel occasions being a respective time window in which the user device is to monitor the control channel on the shared carrier;

determine, using a channel access procedure, that the shared carrier is available to the base station for a transmission time; and transmit to the user device a downlink control information, DCI, indicating that the user device is to start monitoring according to the transmission pattern, the DCI causing the user device to switch from (i) monitoring a control channel on the shared carrier according to the pre-transmission pattern before the transmission time to (ii) monitoring the control channel on the shared carrier according to the transmission pattern during the transmission time.

22. The base station of claim 21, wherein the base station is further configured to:

transmit at least a portion of the control channel information to the user device via the shared carrier during at least one control channel occasion in the transmission pattern.

23. The base station of claim 21, wherein the DCI indicates one or more of (i) that the transmission time has started, (ii) a duration of the transmission time, or (iii) an ending of the transmission time.

24. The base station of claim 21, wherein the DCI is a first DCI that indicates the transmission time, and further comprising:
    transmitting to the user device a second DCI indicating a remaining duration of the transmission time.

25. The base station of claim 21, wherein:
    transmitting the first and second search space configuration indications to the user device includes transmitting an indication of a first time-frequency resource and an indication of a second time-frequency resource to the user device;
    monitoring the control channel during control channel occasions of the pre-transmission pattern causes the user device to monitor the control channel using the first time-frequency resource; and
    monitoring the control channel during control channel occasions of the transmission pattern causes the user device to monitor the control channel using the second time-frequency resource.

26. The base station of claim 21, wherein transmitting the first and second search space configuration indications to the user device includes:
    transmitting one or more radio resource control (RRC) messages to the user device;
    transmitting one or more DCIs to the user device; or
    transmitting one or more messages including medium access control (MAC) control elements to the user device.

\* \* \* \* \*